United States Patent
Maki et al.

[11] Patent Number: 6,097,989
[45] Date of Patent: *Aug. 1, 2000

[54] ADAPTIVE CONTROLLER WITH PARAMETER ADJUSTMENT LAW EXPRESSED IN RECURRENCE FORMULA

[75] Inventors: Hidetaka Maki; Yusuke Hasegawa, both of Saitama, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/881,256

[22] Filed: Jun. 24, 1997

Related U.S. Application Data

[63] Continuation of application No. 08/578,058, Dec. 22, 1995, abandoned, which is a continuation of application No. 08/151,859, Nov. 15, 1993, abandoned.

[30] Foreign Application Priority Data

Nov. 16, 1992 [JP] Japan .................................. 4-330029

[51] Int. Cl.$^7$ .................................................. G05B 13/02
[52] U.S. Cl. .................................. 700/52; 700/37; 700/54
[58] Field of Search ..................................... 364/157, 148, 364/151, 160–165, 172–176; 700/28, 31, 37, 44, 45, 52, 54, 55, 71, 73, 41–43, 67–70; 123/684, 694

[56] References Cited

U.S. PATENT DOCUMENTS

| | | | |
|---|---|---|---|
| 3,794,817 | 2/1974 | Shinskey | 364/177 |
| 3,906,196 | 9/1975 | Spitz | 364/160 |
| 4,330,828 | 5/1982 | Smith et al. | 364/160 X |
| 4,349,869 | 9/1982 | Prett et al. | 364/153 X |
| 4,674,028 | 6/1987 | Shioya et al. | 364/157 X |
| 4,768,143 | 8/1988 | Lane et al. | |
| 5,038,269 | 8/1991 | Grimble et al. | 364/157 X |
| 5,115,391 | 5/1992 | Puthenpura et al. | 364/154 X |
| 5,268,834 | 12/1993 | Sanner et al. | 364/151 |
| 5,283,729 | 2/1994 | Lloyd | 364/157 |

FOREIGN PATENT DOCUMENTS

| | | |
|---|---|---|
| 21 14 785 B2 | 11/1977 | Germany . |
| 27 35 012 A1 | 2/1978 | Germany . |

OTHER PUBLICATIONS

"Digital Adaptive Control", Computrol, No. 27, pp. 28–41, along with brief English explanation.
Automatic Control Handbook, pp. 703–707, along with brief English explanation.
Landau et al, "Unification of Discrete Time Explicit Model Reference Adaptive Control Designs", *Automatica*, vol. 17, No. 4, pp 593–611, 1981.
"A Survey of Model Reference Adaptive Techniques—Theory and Applications", Landau, *Automatica*, vol, 10, pp 353–379, Pergamon Perss, 1974.

(List continued on next page.)

*Primary Examiner*—William Grant
*Assistant Examiner*—Steven R. Garland
*Attorney, Agent, or Firm*—Nikaido, Marmelstein, Murray & Oram LLP

[57] ABSTRACT

An adaptive controller using an adjustment law expressed in recurrence formula, including a plant, a controller which controls an input to the plant, and a parameter adjuster which adjusts a parameter of the controller. In the controller, an input to the parameter adjuster is multiplied by a coefficient other than 1 such that the range of change of the parameter adjuster's internal variable is restricted to a predetermined limit. With this arrangement, the controller can be realized on a less expensive and fewer-bit-length microcomputer such as 16-bits. The input to the parameter adjuster may be made up of the control input to the plant and an output therefrom. Alternatively, the input to the controller and an output from the plant may be both multiplied by a coefficient other than 1 to be input to the parameter adjuster. Further, it may be arranged such that a gain matrix element of the parameter adjuster is intermittently replaced with a prescribed value when it exceeds a limit, or when the cycle of the control exceeds a predetermined number of cycles.

3 Claims, 33 Drawing Sheets

OTHER PUBLICATIONS

"Combining Model Reference Adaptive Controllers and Stochastic Self–tuning Regulators", Landau, *Automatica*, vol. 18, No. 1, pp 77–84, 1982.

J. Duan et al; "Review of Hybrid and Continuous Time Self Tuning Controllers and Analysis of an LQ Design"; IEE; Mar. 25, 1991; London, UK.

J. Duan et al; "Observer–Based Predictive Control"; Sep. 1992; IEEE; 2 vol. (xxv+xxii+1144 pp).

J. Chen et al.; Robust Control of Nonlinear Uncertain Systems: A Feedback Linearization Approach; Decision and Control 1991 Conf.; 1991.-

ADAPTIVE CONTROLLER WITH PARAMETER ADJUSTMENT LAW EXPRESSED IN RECURRENCE FORMULA

This application is a continuation of application Ser. No. 08/578,058 filed Dec. 22, 1995, now abandoned, which in turn is a continuation of application Ser. No. 08/151,859, filed Nov. 15, 1993, now abandoned.

BACKGROUND OF THE INVENTION

1. Field of the Invention

This invention relates to an adaptive controller with a parameter adjustment law expressed in a recurrence formula (e), more particularly to an adaptive controller with a parameter adjustment law expressed in a recurrence formula (e) proposed by I. D. Landau et al, in which the range of change of intermediate values, i.e., the range within which the values can possibly change, of the parameter adjustment law is limited to such an extent that the adaptive controller can be realized on a low-level microcomputer with fewer bit (word) length such as 16-bits.

2. Description of the Prior Art

Among adjustment laws used in adaptive controls, there is one known law proposed by I. D. Landau et al to be used in model reference adaptive control systems (MRACS) or self-tuning regulators (STR). In the proposed technique, an adaptive system is converted into a feedback system equivalent thereto, comprised of a linear block and a non-linear block. The adjustment law is determined such that the input and output of the non-linear block satisfy Popov's integral inequalities, while the transfer function of the linear block becomes perfect positive real, thereby ensuring system stability. The technique was described in "COMPUTROL", No. 27, pp.28–41 (Tokyo: CORONA Publishing Co., Ltd.), or *Automatic Control Handbook,* pp.703–707 (Tokyo: Ohm Publishing Co., Ltd., 1983).

The parameter adjustment law proposed by I. D. Landau et al will further be explained with reference to a simple STR illustrated in FIG. 1. Here, polynomials of the numerator and denominator B/A (the plant—the controlled object of the system) are defined as (1)(2) of Equation 1. The parameter or parameter vector of the adaptive controller $\hat{\theta}(k)$ and the input zeta (k) to the parameter adjuster are defined as in (3) and (4) of Equation 1.

$$\begin{cases} A(z^{-1}) = 1 + a_1 z^{-1} + \ldots + a_n z^{-n} & (1) \\ B(z^{-1}) = b_0 + b_1 z^{-1} + \ldots + b_m z^{-m} & (2) \end{cases} \quad \text{Eq. 1}$$

$$\hat{\Theta}^T(k) = \{\hat{b}_o(k), \hat{B}_R(z^{-1}, k), \hat{S}(z^{-1}, k)\} \quad (3)$$

$$= \{\hat{b}_o(k), \hat{r}_1(k), \ldots, r_{m+d-1}(k), S_o(k), \ldots, S_{n-1}(k)\}$$

$$\zeta^T(k) = \{u(k), \ldots, u(k-m-d+1), y(k), \ldots, y(k-n+1)\} \quad (4)$$

$\hat{\theta}(k)$ is also expressed in Equation 2. $\Gamma(k)$ and $e^*(k)$ in Equation 2 represent gain matrix and identification error signal, and are expressed in recurrence formulae as shown in Equations 3 and 4.

$$\hat{\theta}(k) = \hat{\theta}(k-1) + \Gamma(k-1)\xi(k-d)\ e^*(k) \quad \text{Eq. 2}$$

$$\Gamma(k) = \frac{1}{\lambda_1(k)}\left[\Gamma(k-1) - \frac{\lambda_2(k)\Gamma(k-1)\zeta(k-d)\zeta^T(k-d)\Gamma(k-1)}{\lambda_1(k) + \lambda_2(k)\zeta^T(k-d)\Gamma(k-1)\zeta(k-d)}\right] \quad \text{Eq. 3}$$

$$e^*(k) = \frac{D(z^{-1})y(k) - \hat{\theta}^T(k-1)\zeta(k-d)}{1 + \zeta^T(k-d)\Gamma(k-1)\zeta(k-d)} \quad \text{Eq. 4}$$

Depending on how $\lambda_1(k)$ and $\lambda_2(k)$ are chosen in Equation 3, one algorithm is selected. For example, if $\lambda_1(k)=1$ and $\lambda_2(k)=0$, it is a constant gain algorithm. If $\lambda_1(k)=1$ and $\lambda_2(k)=\lambda(0<\lambda<2)$, it is a gradually-decreasing gain algorithm (least squares method when $\lambda=1$). If $\lambda_1(k)=\lambda_1(0<\lambda_1<1)$ and $\lambda_2(k)=\lambda_2(0<\lambda_2<\lambda)$, it is a variable gain algorithm (weighted least squares method when $\lambda_2=1$). When rewriting $\lambda_1(k)/\lambda_2(k)$ as $\sigma$ and $\lambda_3$ is expressed as in Equation 5, if $\lambda_1(k)=\lambda_3$, it is a constant trace algorithm.

$$\lambda_3(k) = 1 - \frac{\|\Gamma(k-1)\zeta(k-d)\|^2}{\sigma + \zeta^T(k-d)\Gamma(k-1)\zeta(k-d)} \cdot \frac{1}{\text{tr}\Gamma(0)} \quad \text{Eq. 5}$$

Aside from the above, when such a calculation is conducted on a digital computer, since the digital computer has a particular bit (word) length such as 4, 8, 16 or 32 bits intrinsically determined by the configuration of its registers, data buses or the like, variables in the calculation have to be restricted, in some cases, within a predetermined range. For example, when a variable's least significant bit (LSB) is assigned with a small value so as to enhance calculation accuracy, a possible maximum value of the variable is thereby limited to a certain extent, and hence the range of change of the variable is automatically restricted. If the parameter adjuster is intended to be realized on a digital computer, not all variables of the parameter adjuster are free from the problem. Note that the "variable" or "intermediate variable" referred to in the specification means all variables calculated finally (or even temporarily) in the adaptive controller such as $\Gamma(k)$, $\Gamma(k-1)\xi(k-d)$, $\Gamma(k-1)\xi(k-d)\Gamma^T(k-1)$, $\hat{\theta}^T(k-1)\xi(k-d)$, etc.

This will be explained with reference to a time-varying plant illustrated in FIG. 2. The configuration in FIG. 2 is a modification of the STR illustrated in FIG. 1; specifically, in the STR illustrated in FIG. 1, some values are defined more concretely as:

delay $d=2$, $A(z^{-1})=1+a_1 z^{-1}$, and $B(z^{-1})=b_0+b_1 z^{-1}$, wherein the values $a_1$, $b_0$, $b_1$ are supposed to change with respect to time. The model of the configuration in FIG. 2 is assumed as expressed in Equation 6.

$$\begin{cases} A(z^{-1}) = 1 + a_1 z^{-1} \\ B(z^{-1}) = b_0 + b_1 z^{-1} \end{cases} \quad \text{Eq. 6}$$

$$\hat{\Theta}^T(k) = \{\hat{b}_o(k), \hat{B}_R(z^{-1}, k), \hat{S}(z^{-1}, k)\}$$

$$= \{\hat{b}_o(k), \hat{r}_1(k), \hat{r}_2(k), \hat{S}_0(k)\}$$

$$\zeta^T(k) = \{u(k), u(k-1), u(k-2), y(k)\}$$

Assume that each variable's LSB is assigned with a sufficiently small value and a simulation is conducted with sufficient bit length. If such an input r(k) as is expressed in FIG. 3 is given to the controller, the output y(k) from the plant will be as shown in FIG. 4. FIG. 5 shows the control error (=r(k)−y(k)), and demonstrates that the STR follows the plant's change and functions properly as a regulator. When selecting one element $\Gamma_{11}(k)$ (first row, first column) of the gain matrix as the representative of the intermediate variables of the parameter adjuster, the value will be as shown in FIG. 6. It will be understood from the figure that the change of the value is relatively large, and ranges from $4\times10^7$ through $8\times10^8$. In integer calculation, it is difficult for a microcomputer with a small string of bits such as 16-bits to handle such a large value.

Further, assume that the bit length is sufficiently prepared for the intermediate values used in the calculation of the parameter adjuster, but that the LSB is assigned with a relatively large value. The control error r(k)−y(k) at that instance is then observed. As illustrated in FIG. 7, the control error becomes greater, degrading control performance. Thus, when the adaptive controller is intended to be realized on a digital computer with high accuracy, it becomes necessary to assign a small value even for the intermediate values' LSBs and if doing so, it becomes necessary to use a digital computer having bit length sufficiently for preventing overflow in the computer. As a result, it is quite difficult to introduce an adaptive controller into a control system having a short sampling period using a low-level, fewer-bit-length, and hence less expensive microcomputer. In other words, if a sampling period in the control system is short, it becomes necessary to use an expensive, high-level microcomputer with larger bit length.

In other words, the method proposed by I. D. Landau et al was a theoretical one, and realizing an adaptive controller on a computer in real time basis and with a short sampling period has not been examined.

SUMMARY OF THE INVENTION

An object of the invention is therefore to overcome the aforesaid drawbacks of the prior art by providing an adaptive controller having a parameter adjustment law expressed in a recurrence formula, in which the controller is enabled to be realized using a low-level, fewer-bit-length microcomputer.

Another object of the invention is to provide an adaptive controller having a parameter adjustment law expressed in a recurrence formula in which the controller is enabled to be introduced into a system having a short sampling period while using a fewer-bit-length microcomputer.

Further object of the invention is to provide an adaptive controller having a parameter adjustment law expressed in a recurrence formula in which the controller is enabled to be realized with enhanced control accuracy and improved control stability while using a fewer-bit-length microcomputer.

For realizing the objects, the present invention provides an adaptive controller using a parameter adjustment law expressed in a recurrence formula, including, a plant, a controller which controls an input to the plant, and a parameter adjuster which adjusts a parameter of the controller. In the controller the improvement comprises, an input to the parameter adjuster being multiplied by a coefficient other than 1 such that the range of change of its internal variable is restricted to a predetermined limit.

BRIEF DESCRIPTION OF THE DRAWINGS

These and other objects and advantages of the invention will be more apparent from the following description and drawings, in which.

DETAILED DESCRIPTION OF THE PREFERRED EMBODIMENTS

Embodiments of the invention will be explained below, taking as an example an adaptive controller for fuel metering for an internal combustion engine. The controller is intended to control fuel injection amount to a desired value, adaptively correcting for fuel transport delay due to the injected fuel's deposit on the intake pipe wall.

Figure 8:
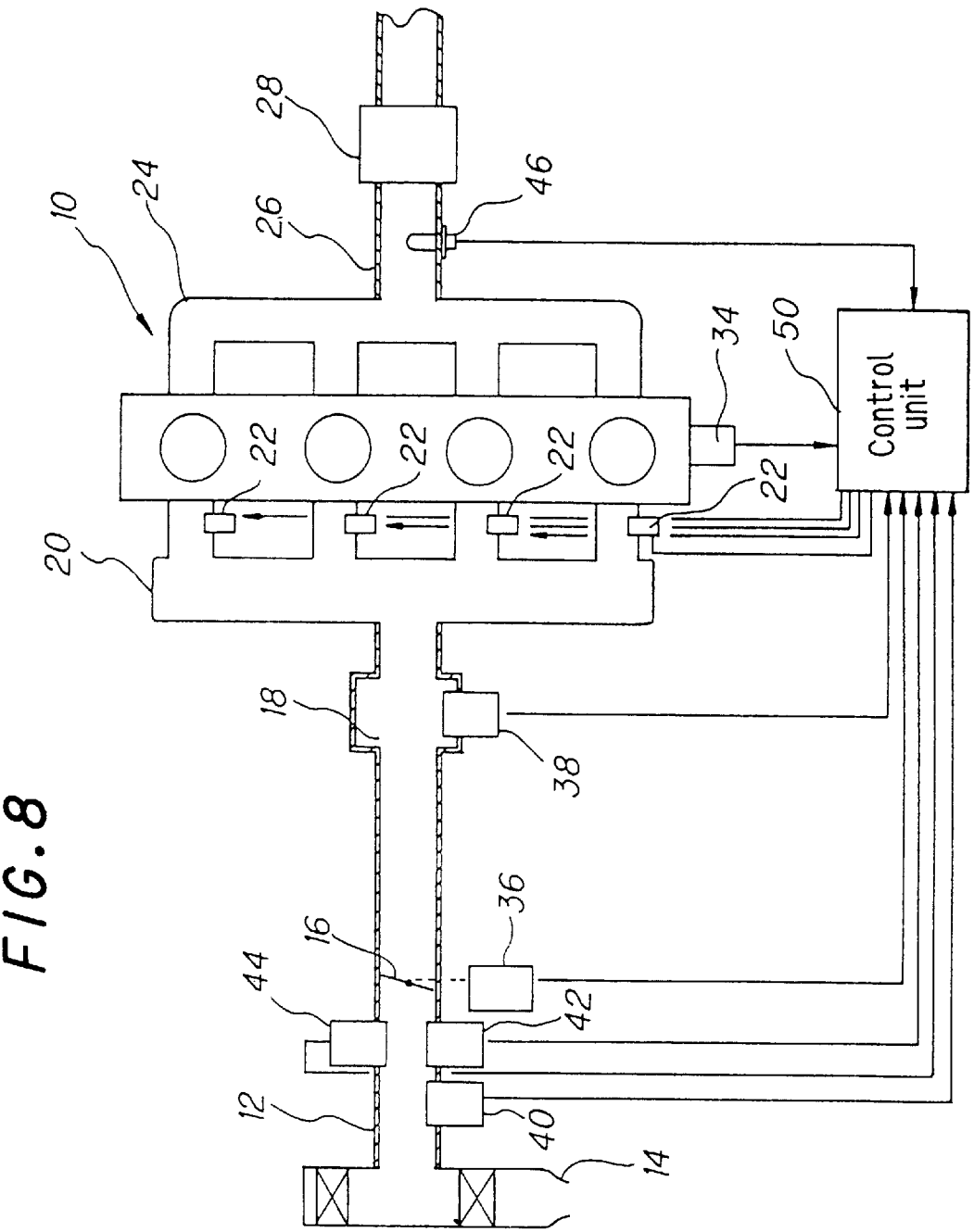
FIG. 8 is an overall explanatory view of a fuel metering control system for an internal combustion engine to be used in the invention.

FIG. 8 is an overall view of the controller. In this figure, reference numeral 10 designates a four cylinder internal combustion engine. Air drawn in through an air cleaner 14 mounted on the far end of an air intake path 12 is supplied to the first through fourth cylinders through a surge tank 18 and an intake manifold 20, while the flow thereof is adjusted by a throttle valve 16. An injector 22 for injecting fuel is installed in the vicinity of the intake valve (not shown) of each cylinder. The injected fuel mixes with the intake air to form an air-fuel mixture that is ignited in the associated cylinder by a spark plug (not shown). The resulting combustion of the air-fuel mixture drives down a piston (not shown). The exhaust gas produced by the combustion is discharged through an exhaust valve (not shown) into an exhaust manifold 24, from which it passes through an exhaust pipe 26 to a three-way catalytic converter 28, where it is removed of noxious components before being discharged to the exterior.

A crankshaft sensor 34 for detecting the piston crank angles is provided in a distributor (not shown) of the internal combustion engine 10, a throttle position sensor 36 is provided for detecting the degree of opening θTH of the throttle valve 16, and a manifold absolute pressure sensor 38 is provided for detecting the absolute pressure Pb of the intake air downstream of the throttle valve 16. On the upstream side of the throttle valve 16 are provided an atmospheric pressure sensor 40 for detecting the atmospheric (barometric) pressure Pa, an intake air temperature sensor 42 for detecting the temperature of the intake air, and a hygrometer 44 for detecting the humidity of the intake air. An air/fuel ratio sensor 46 comprising an oxygen concentration detector is provided in the exhaust system at a point downstream of the exhaust manifold 24 and upstream of a three-way catalytic converter 28, where it detects the air/fuel ratio of the exhaust gas. The outputs of the sensor 34, etc. are sent to a control unit 50.

Figure 9:
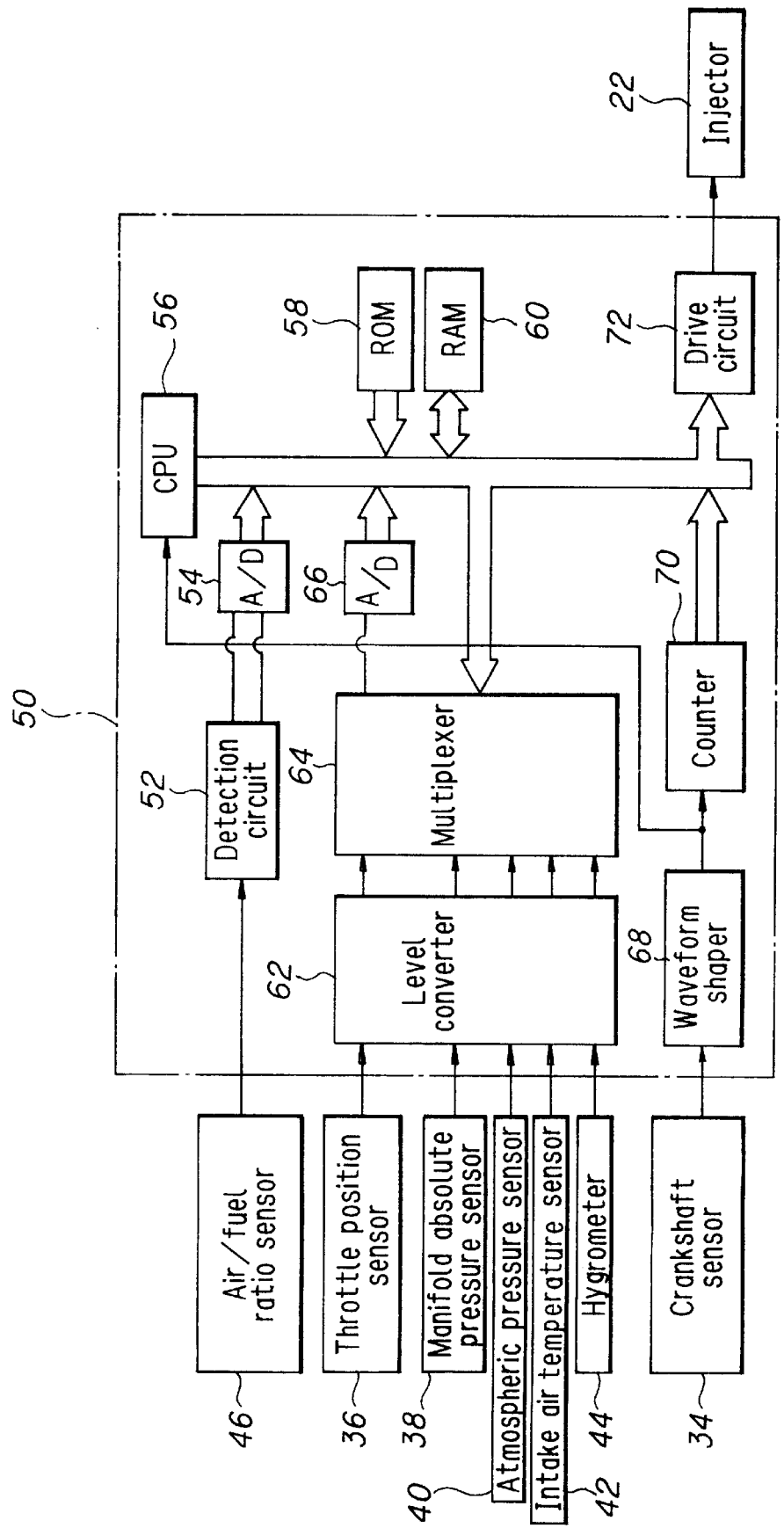
FIG. 9 is a block diagram showing the details of the control unit illustrated in FIG. 8.

Details of the control unit 50 are shown in the block diagram of FIG. 9. The output of the air/fuel ratio sensor 46 is received by a detection circuit 52 of the control unit 50, where it is subjected to appropriate line-arization processing to obtain an air/fuel ratio (A/F), which is characterized by the fact that it varies linearly with the oxygen concentration of the exhaust gas over a broad range extending from lean to rich. The output of the detection circuit 52 is forwarded through an A/D (analog/digital) converter 54 to a microcomputer, which is comprised of a CPU (central processing unit) 56, a ROM (read-only memory) 58, and a RAM (random access memory) 60, in which the output is stored. Similarly, the analog outputs of the throttle position sensor 36, etc., are input to the microcomputer through a level converter 62, a multiplexer 64 and a second A/D converter 66, while the output of the crankshaft sensor 34 is shaped by a waveform shaper 68 and has its output value counted by a counter 70; the result of the count is input to the microcomputer. In accordance with commands stored in the ROM 58, the CPU 56 of the microcomputer computes control values in a manner explained below and drives the injectors 22 of the individual cylinders via a drive circuit 72. A microcomputer with 16-bit length or so, less expensive and hence more cheaply mounted on a vehicle, is used.

Since a portion of the injected fuel deposits in such locations as the wall of the intake port, the amount of fuel that actually flows to a cylinder (actual cylinder fuel flow) is less than the desired fuel injection amount (desired cylinder fuel flow), and the decrease will therefore be expressed as a first-order lag. Additionally, taking into account the air/fuel ratio sensor's detection lag (dead time), the plant will have a transfer function as is shown in Equation 7.

$$P(z) = \frac{b_0 + b_1 z^{-1}}{1 + a_1 z^{-1}} z^{-d} \qquad \text{Eq. 7}$$

Figure 10:
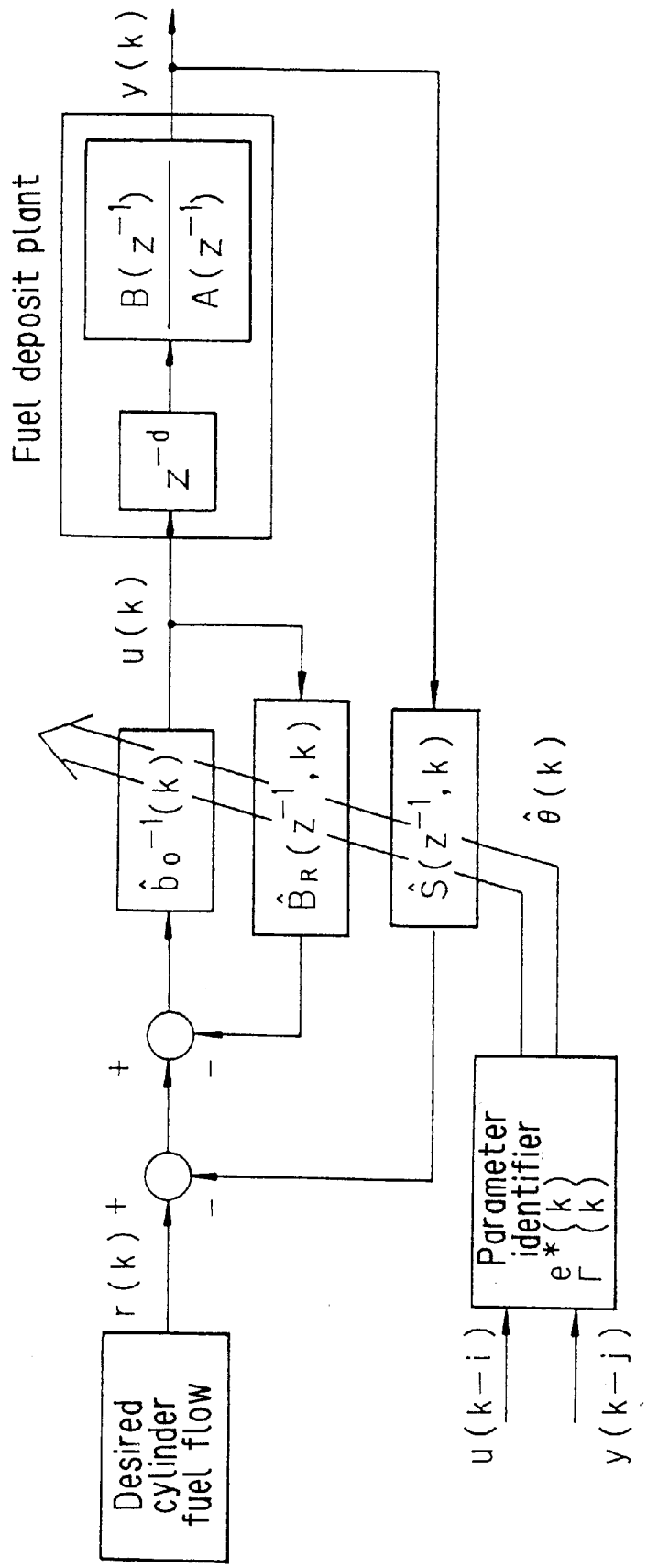
FIG. 10 is an explanatory view of an adaptive controller used in the system illustrated in FIG. 8.

The fuel deposit plant is thus a time-varying plant which varies depending on the condition of the engine. In other words, the values $a_1$, $b_0$, $b_1$ vary with respect to time. Thus, the CPU 56 controls so as to compensate for the time-varying fuel deposit plant. FIG. 10 shows the structure of the adaptive controller.

Figure 11:
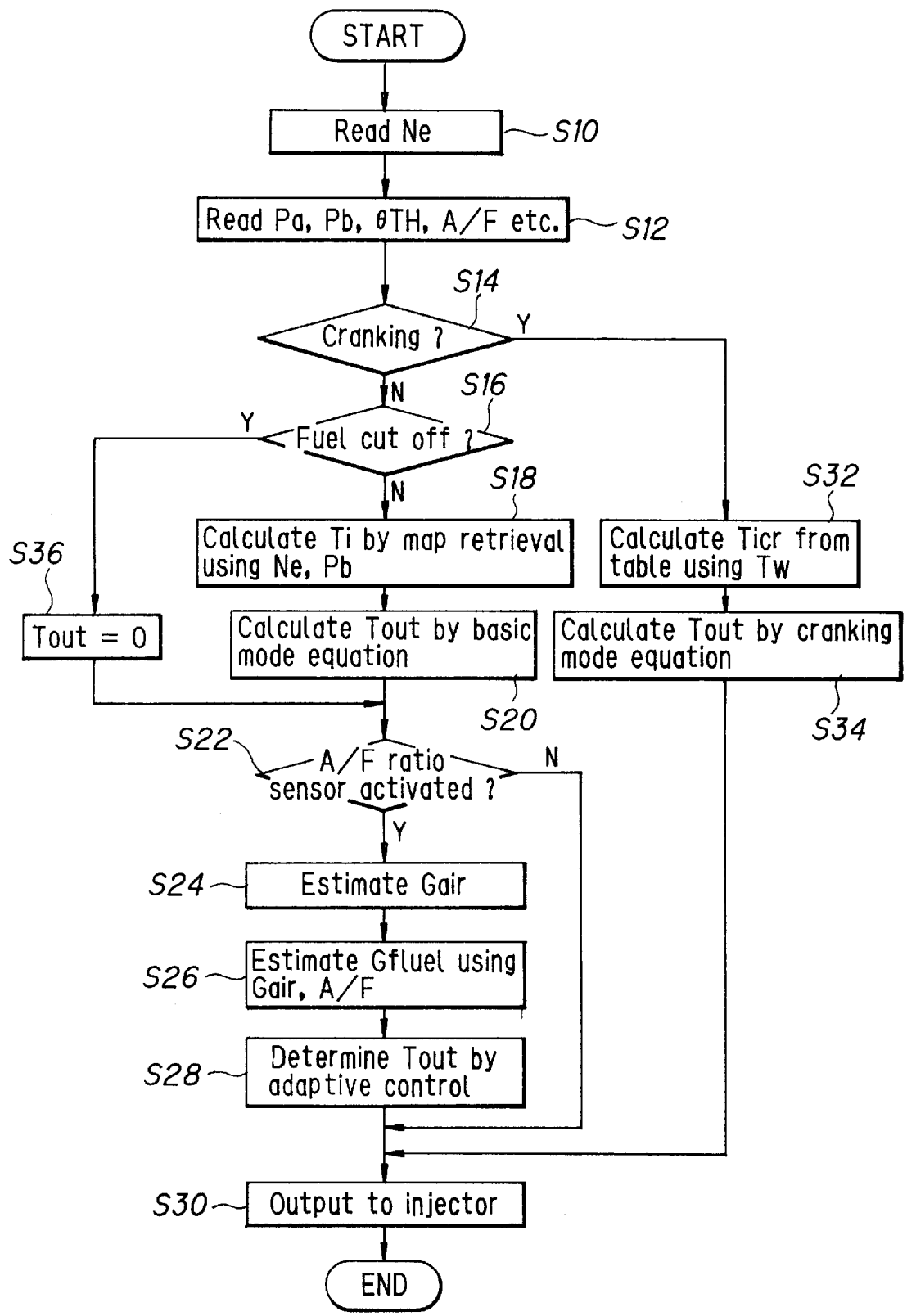
FIG. 11 is a flow chart showing the operation of the control unit illustrated in FIG. 9.

The operation of the control unit shown in FIG. 9 will now be explained with reference to the flow chart in FIG. 11.

The engine speed Ne detected by the crank-shaft sensor 34 is read in step S10. The program then passes to step S12, in which the atmospheric pressure Pa, the manifold absolute pressure Pb, the throttle opening θTH, the air/fuel ratio (A/F) and other similar values detected by the atmospheric pressure sensor 40 etc., are read.

The program then passes to step S14, in which discrimination is made as to whether or not the engine is cranking, and if it is not, to step S16 in which a discrimination is made as to whether or not the fuel supply has been cut off. If the result of the discrimination is negative, the program passes to step S18, in which a basic desired cylinder fuel flow (basic fuel injection amount) Ti is calculated by map retrieval (not shown), using the engine speed Ne and the manifold absolute pressure Pb as address data. It then passes to step S20, in which the aforesaid desired cylinder fuel flow (fuel injection amount) Tout is calculated mainly from the value Ti and in terms of injector's injection period in accordance with a basic mode equation. (The basic mode equation is a well-known method that does not use the aforesaid adaptive control.)

The program then passes to step S22 in which a discrimination is made as to whether or not activation of the air/fuel ratio sensor 46 has been completed, and if it has, to step S24, in which an actual cylinder air flow Gair is estimated. It then passes to step S26, in which the actual cylinder fuel flow Gfuel is estimated by dividing the estimated value Gair by the detected air/fuel ratio (A/F), to step S28, in which the fuel injection amount Tout is finally determined as will be explained below, and to step S30, in which the value Tout is output to the injector 22 of the associated cylinder through the drive circuit 72.

When it is found in step S14 that the engine is cranking, the program passes through steps S32 and S34 for calculating the start mode control value. When step S16 finds that the fuel supply has been cut off, the program passes to step S36, in which the value Tout is set to zero. If step S22 finds that the sensor has not been activated, the program jumps directly to step S30 and the injector is driven by the basic mode control value. Since, however, the gist of the invention resides in a calculation in the adaptive control and not in the adaptive control itself, and since the adaptive control itself was explained in the assignee's Japanese Patent Application No. 4(1992)–215,665; also filed in the United States on Jul. 2, 1993 under the number of 08/085,157, now U.S. Pat. No. 5,448,978, no further explanation will be made.

At this point, the calculation itself will be explained.

Figure 1:
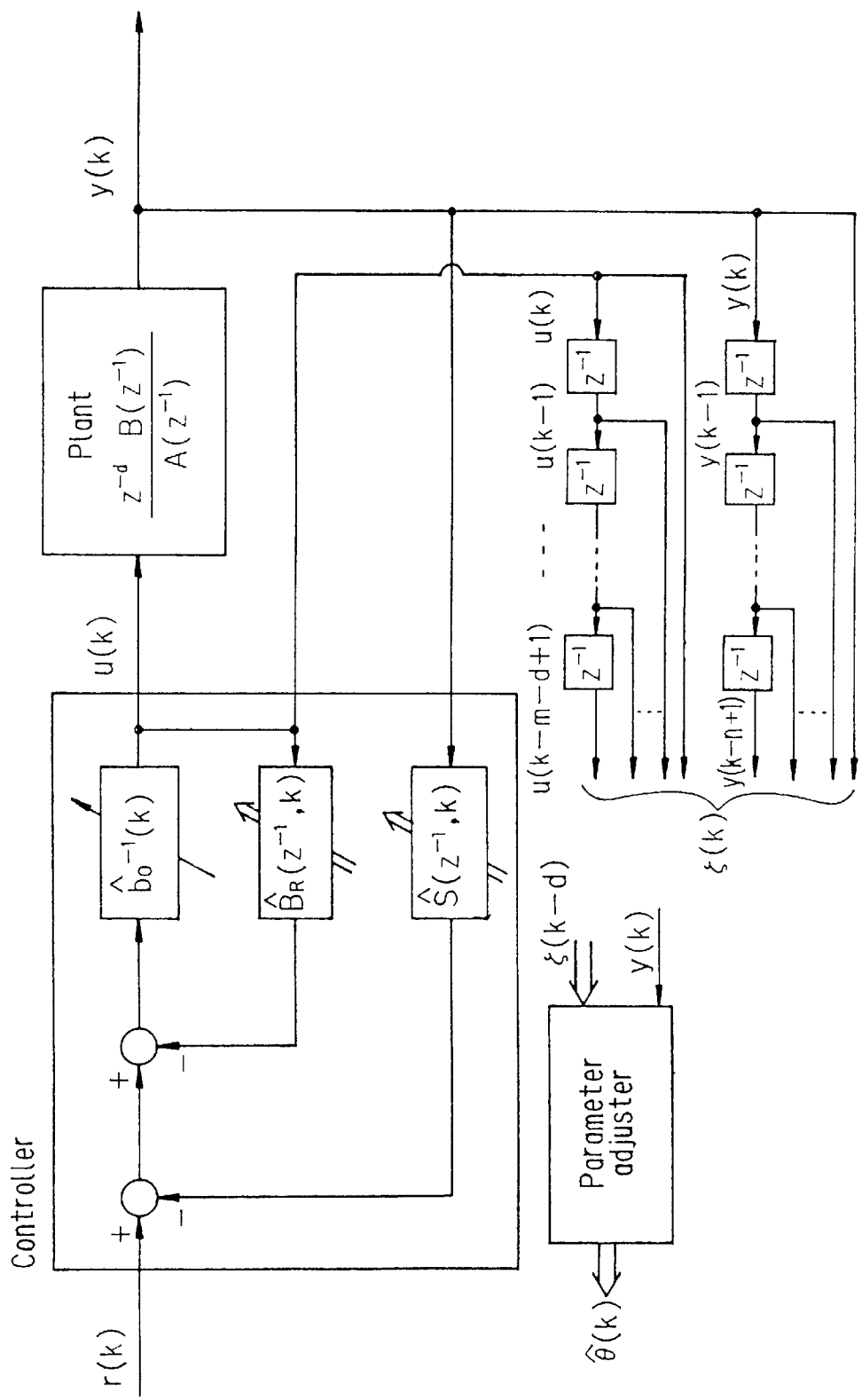
FIG. 1 is an explanatory view generally showing the configuration of an adaptive controller with parameter adjustment law proposed by I. D. Landau et al.
Figure 2:
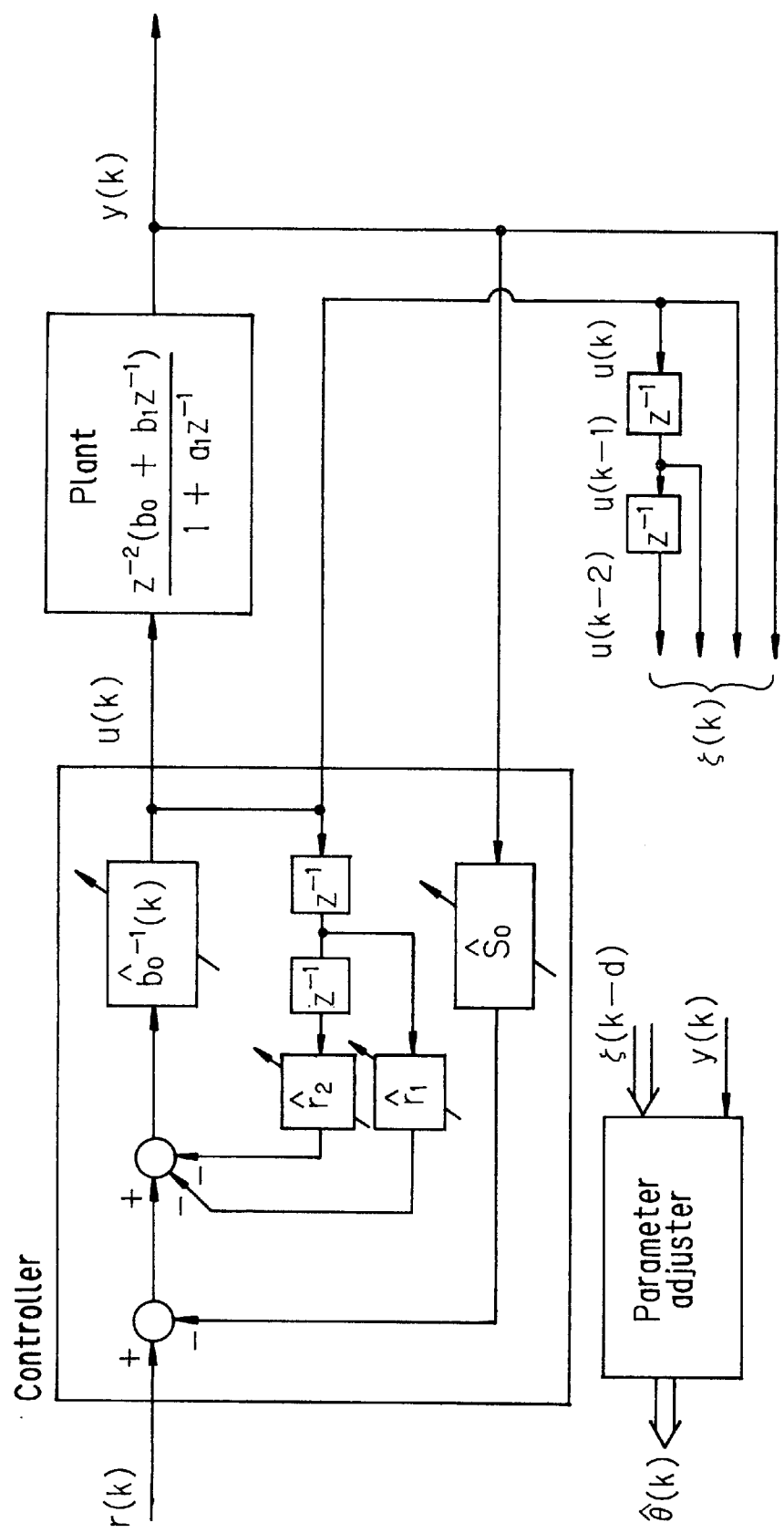
FIG. 2 is an explanatory view showing a more concrete example of an adaptive controller with a time-varying plant modified from the configuration of FIG. 1.
Figure 3:
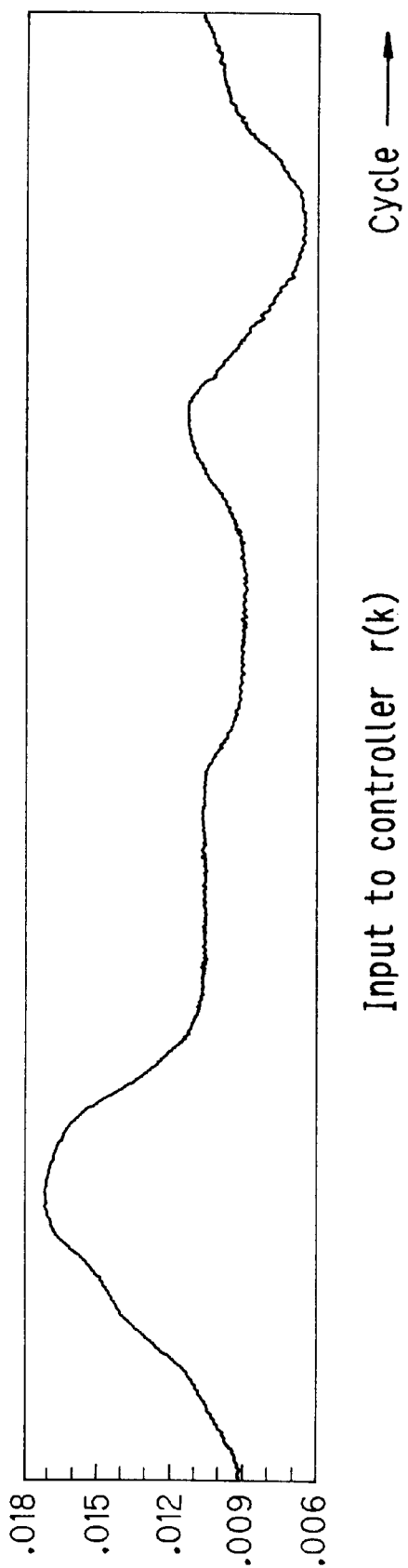
FIG. 3 is the result of a simulation showing an input to the controller illustrated in FIG. 2.
Figure 4:
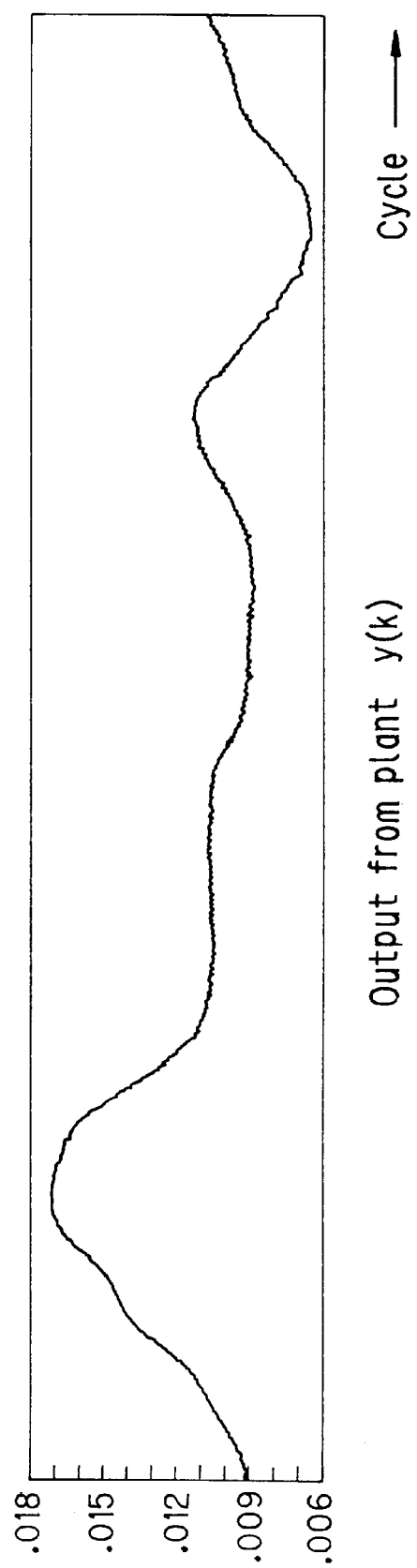
FIG. 4 is the result of a simulation showing an output from the plant illustrated in FIG. 2.
Figure 5:
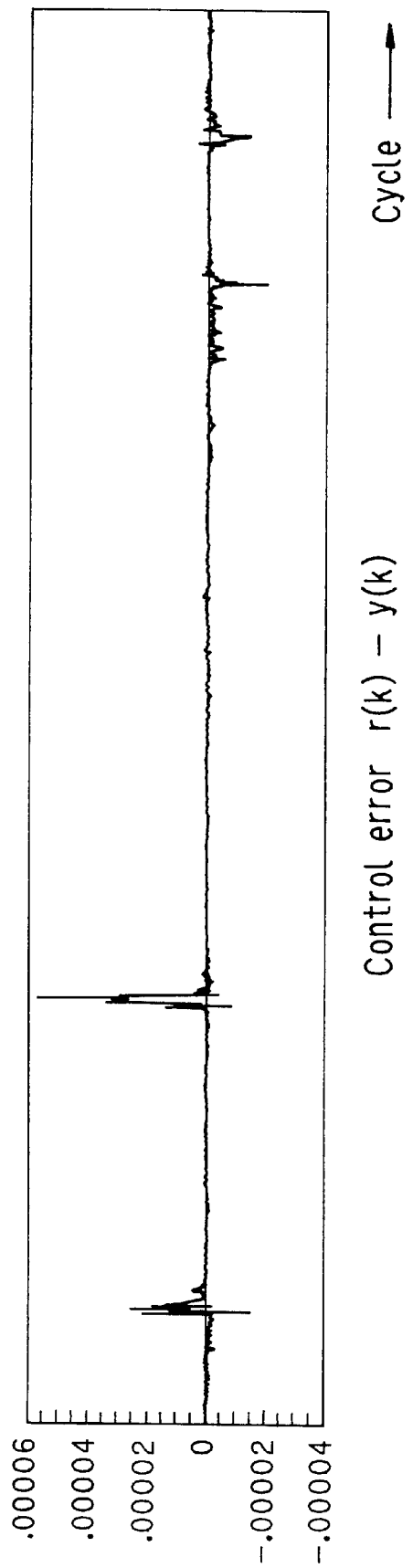
FIG. 5 is the result of a simulation showing the control error of the controller illustrated in FIG. 2.
Figure 6:
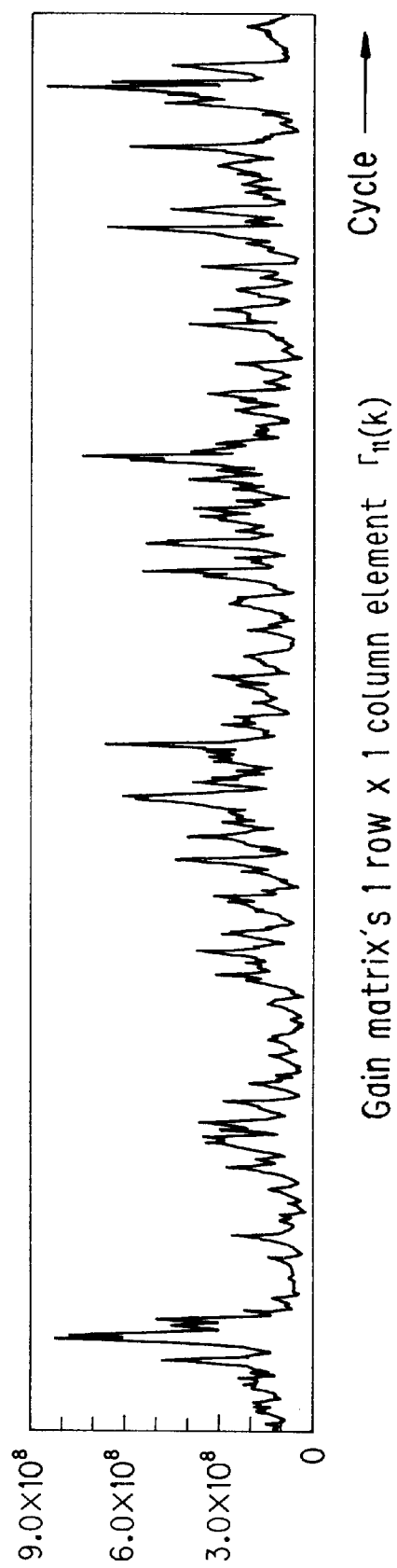
FIG. 6 is the result of a simulation showing an element $\Gamma_{11}(k)$ of a gain matrix of the parameter adjuster illustrated in FIG. 2.
Figure 7:
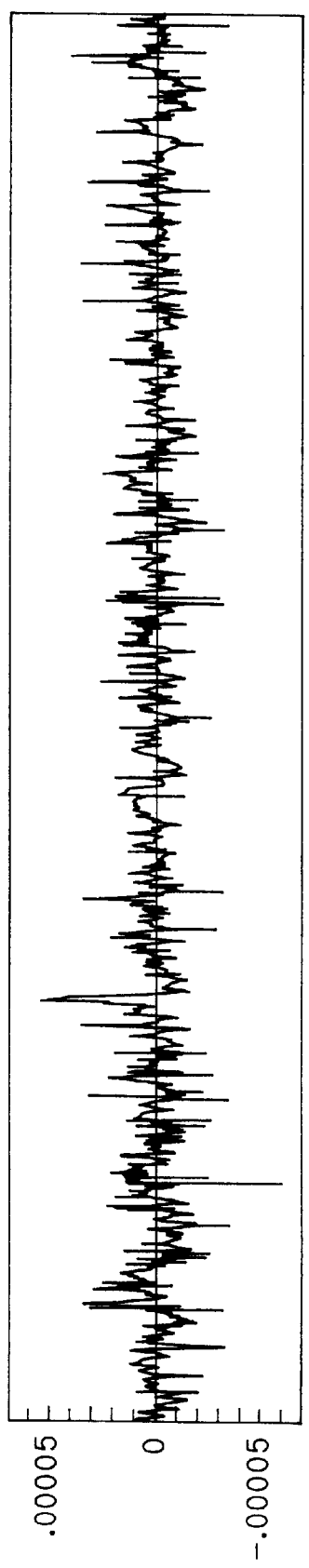
FIG. 7 is the result of a simulation of the case in which a large value is assigned for LSB in the configuration illustrated in FIG. 2.
Figure 12:
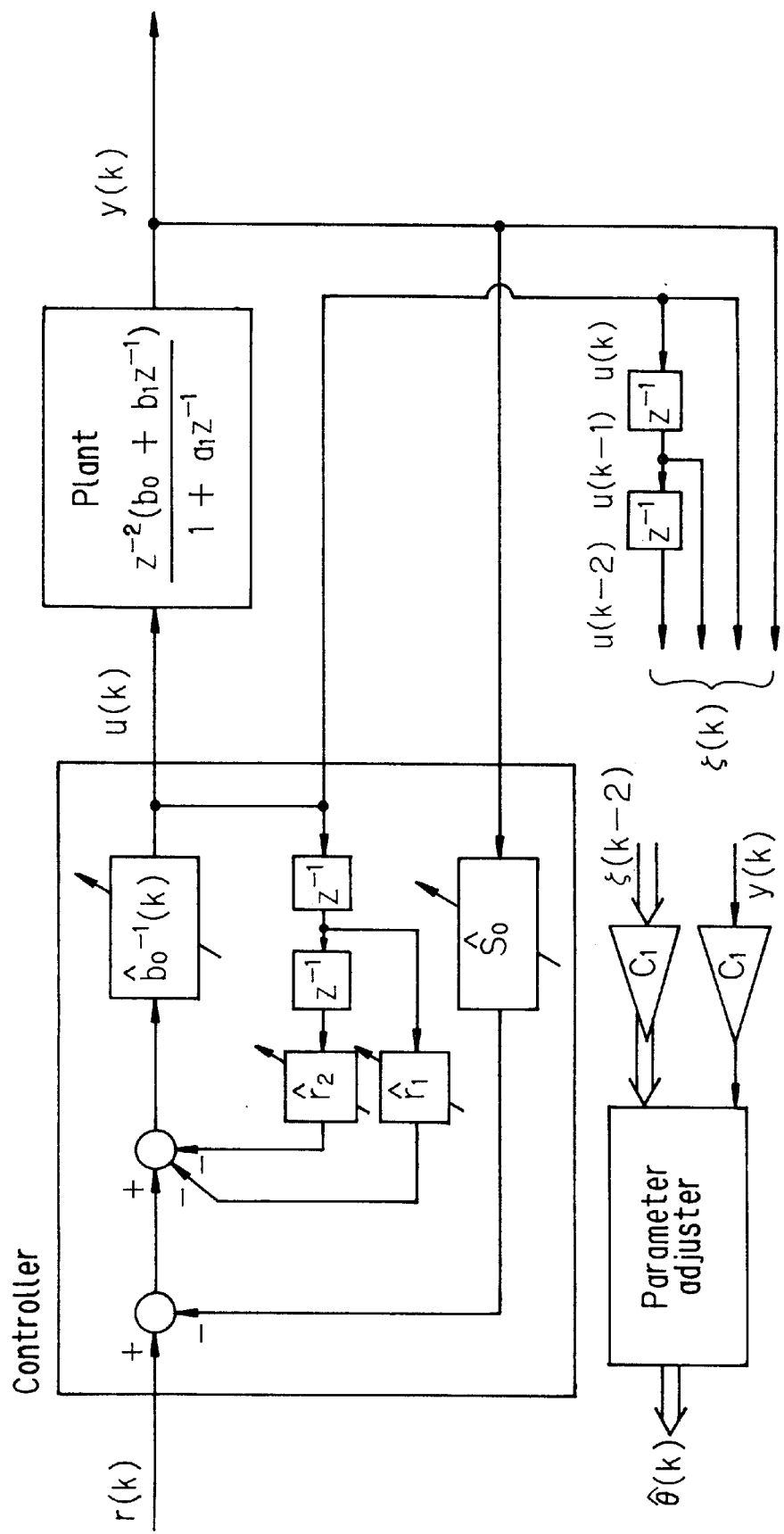
FIG. 12 is a block diagram showing the first embodiment of the invention, mainly made up of the configuration illustrated in FIG. 10.

As will be understood from Equations 2 through 4, the range within which the intermediate values can possibly change is determined by the input zeta (k) to the parameter adjuster. Therefore, it is arranged in the invention such that, in order to restrict the range of the intermediate values, the value zeta (k) is multiplied by a coefficient other than 1 (the coefficient hereinafter referred to as "C1"), and the product is then input to the parameter adjuster. More specifically, the value $\Gamma(k)$ is in inverse proportion to the square of the coefficient C1, as will be derived out from Equation 3. On the other hand, the value $\hat{\theta}(k)$ (the output of the parameter adjuster) is determined solely by the controlled plant. Therefore, it is apparent in theory that although the values zeta (k) and y(k) are multiplied by the coefficient C1, the output supplied to the controller remains unchanged. This is illustrated in FIG. 12, which is a modification of FIG. 10. In the configuration, the condition of the model is the same as that of FIG. 2.

Figure 13:
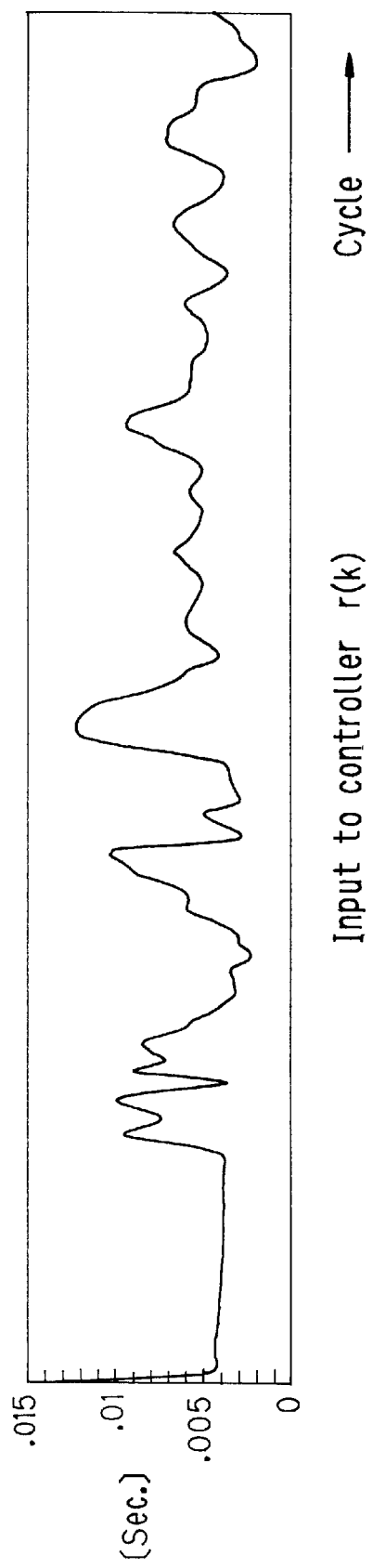
FIG. 13 is the result of a simulation showing an input to the controller illustrated in FIG. 10.

This will be explained with reference to FIGS. 13 and following. In order to realize the adaptive control referred to in step S28 in the flow chart in FIG. 11 on the microcomputer with fewer bit length, the routine at that step is simulated. FIGS. 13 and following show the results of that simulation. The simulation was conducted using the adaptive controller for the plant expressed in Equation 7, while selecting the variable gain algorithm. Here, the desired value r(k) is equal to the desired cylinder fuel flow that calculated at step S20 in the flow chart of FIG. 11, and the plant's input u(k) is the value Tout finally determined at step S28 in the flow chart. The plant's output y(k) is the actual cylinder fuel flow Gfuel, estimated at step S26 in the flow chart, to be input to the controller and the parameter adjuster.

Figure 14:
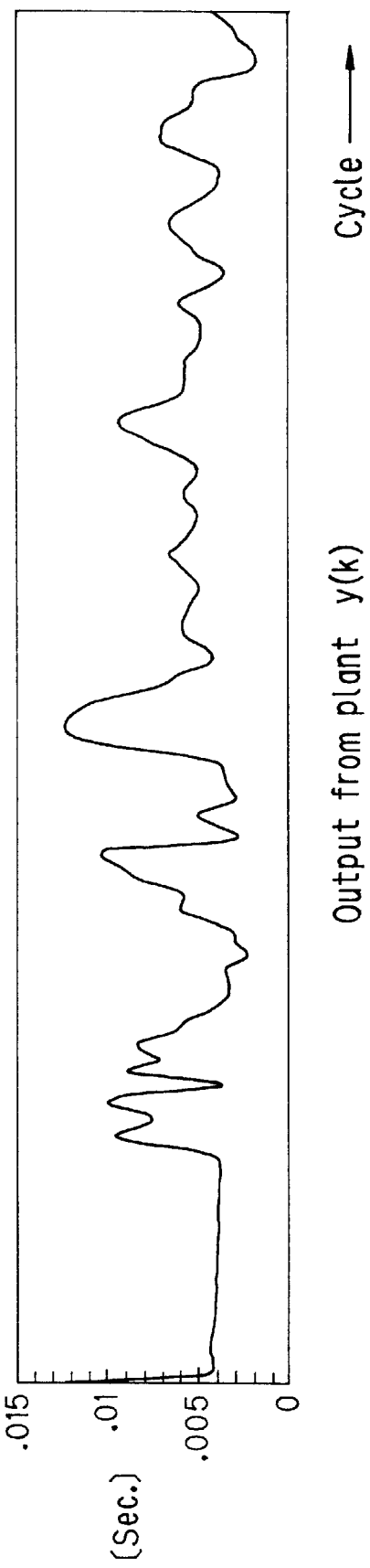
FIG. 14 is the result of a simulation showing an output from the plant illustrated in FIG. 10.
Figure 15:
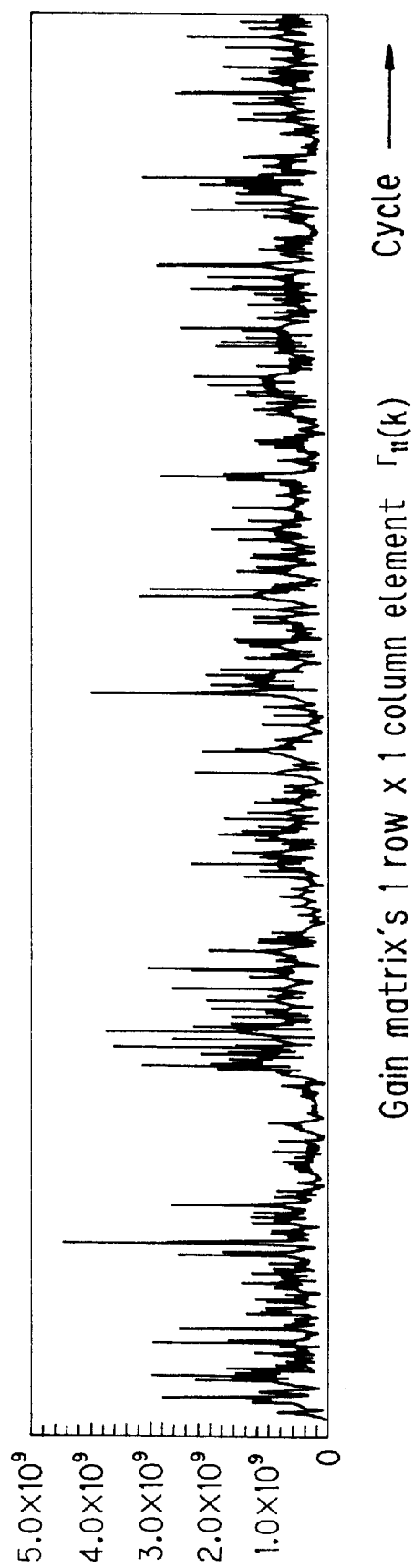
FIG. 15 is the result of a simulation showing the change of gain matrix element $\Gamma_{11}(k)$ of the parameter adjuster illustrated in FIG. 10.
Figure 16:
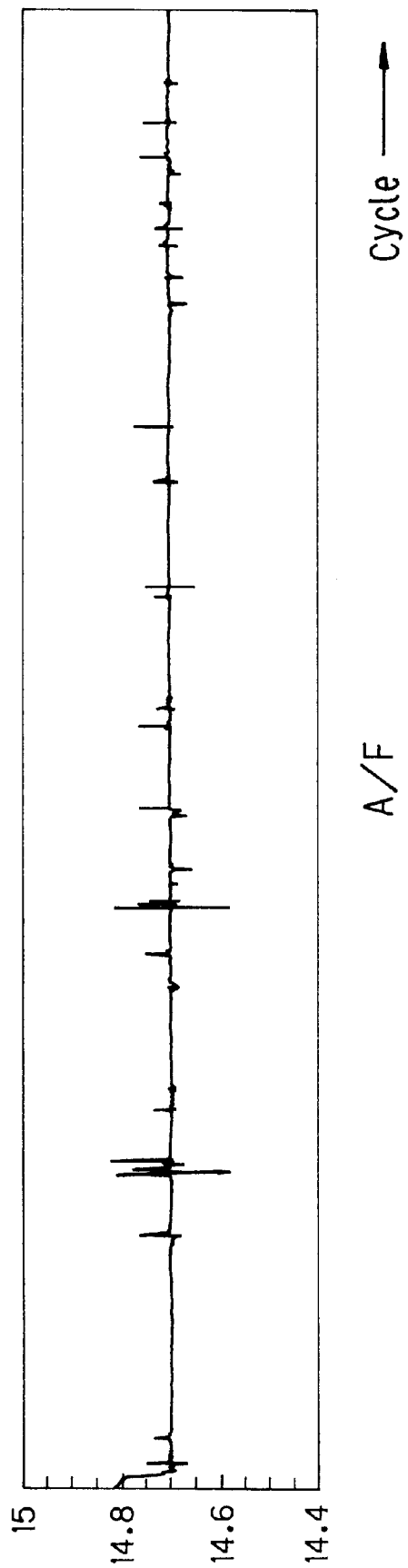
FIG. 16 is the result of a simulation showing the response of the air/fuel ratio in the controller of FIG. 10 indexing the control performance.

Let us suppose the case where the LSB is assigned with a sufficiently small value while the bit length is set to be sufficiently large as mentioned above and that r(k) (the controller's input indicative of desired cylinder fuel flow (desired fuel injection amount)) is set to be a value defined in terms of open period (in seconds) of the injector 22 as is shown in FIG. 13. In such a case, the plant output y(k), the element $\Gamma_{11}(k)$ of the gain matrix representing intermediate variables, and the air/fuel ratio indexing control performance will be as shown in FIGS. 14 through 16. As will be seen from FIG. 15, the value $\Gamma_{11}(k)$ reaches $4.5 \times 10^9$ at maximum. It is not easy to handle such a value in a 16-bit microcomputer.

Figure 17:
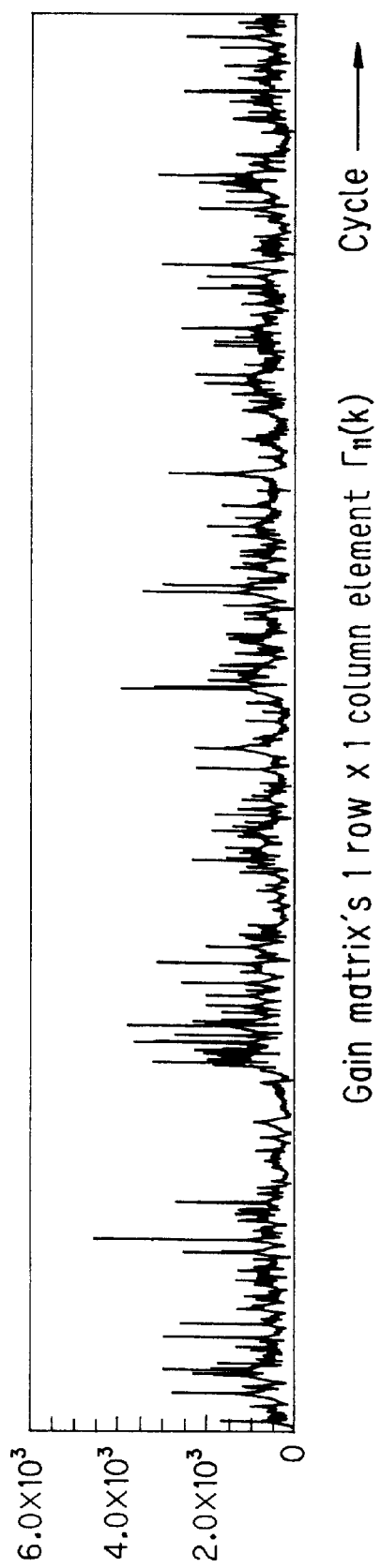
FIG. 17 is the result of a simulation showing the change of the gain matrix element $\Gamma_{11}(k)$ of the parameter adjuster of FIG. 12, illustrating the first embodiment of invention.
Figure 18:
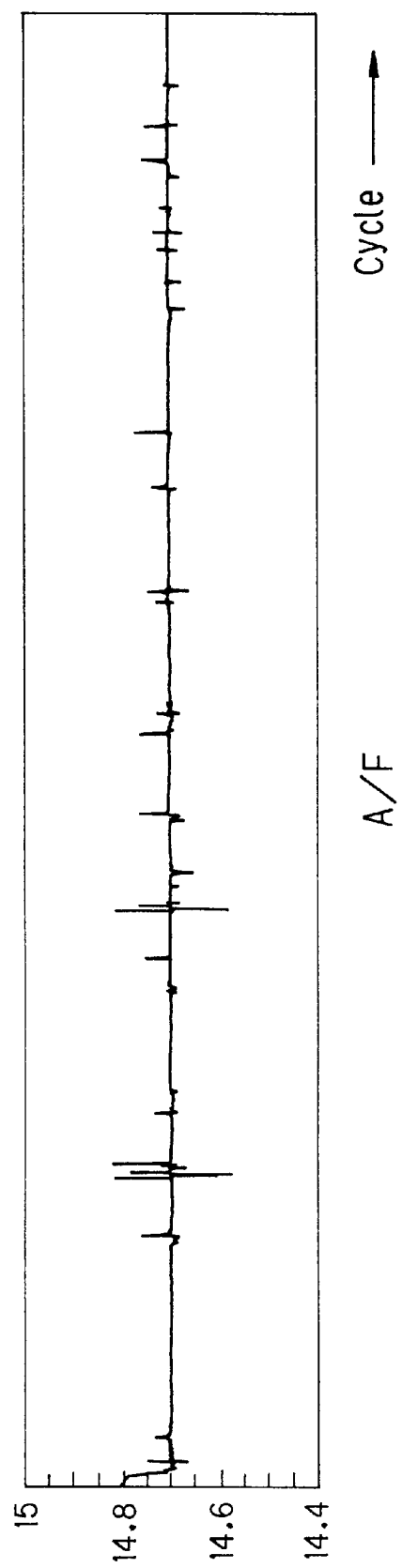
FIG. 18 is the result of a simulation showing the response of the air/fuel ratio in the adaptive controller illustrated in FIG. 12.

Therefore, multiplying the values zeta (k–d) and y(k) input to the parameter adjuster by the coefficient C1 as illustrated in FIG. 12, the response is observed. Here C1 is set to be 1000 and the desired cylinder fuel flow r(k) is set to be the same value as that used in FIG. 13. The value $\Gamma_{11}(k)$ and the air/fuel ratio become as shown in FIGS. 17 and 18. In FIG. 17, $1/C1^2 = 1/10^6$ when compared with that shown in FIG. 15, and comparison of FIG. 18 with FIG. 16 shows that control performance is almost the same. It has thus been validated that the range of change of the intermediate value is able to be decreased. Although the variable gain algorithm is used here, the result would be the same if the gradually-decreasing gain algorithm were used. As regards the constant gain algorithm or the constant trace algorithm, it can be said that, although the value $\Gamma(k)$ is constant or small in its range of change, other intermediate values than the value $\Gamma(k)$, such as $\Gamma(k-1)$zeta(k–d) or $\hat{\theta}^{\Gamma}(k-1)$ zeta (k–d), would also be restricted in its range of change if multiplied by the coefficient.

In the embodiment, it is noted that the intermediate value is in inverse proportion to the square of the value input to the parameter adjuster, and it is arranged such that the intermediate value is decreased by increasing the input value. With this arrangement, when the LSB is assigned with a small value so as to obtain a desired accuracy in the control, it becomes possible to restrict the range of change of the intermediate values, without increasing bit length, so as not to cause overflow. Thus, it becomes possible to conduct the calculation on a less expensive microcomputer of lesser bit length such as 16-bits. Further, since it becomes possible to calculate at a higher speed because the bit length is small, the disclosed configuration can cope with a control having a short sampling period. Furthermore, as mentioned above, it has been validated that the multiplication of the parameter adjuster's input by the coefficient does not affect control performance.

Figure 19:
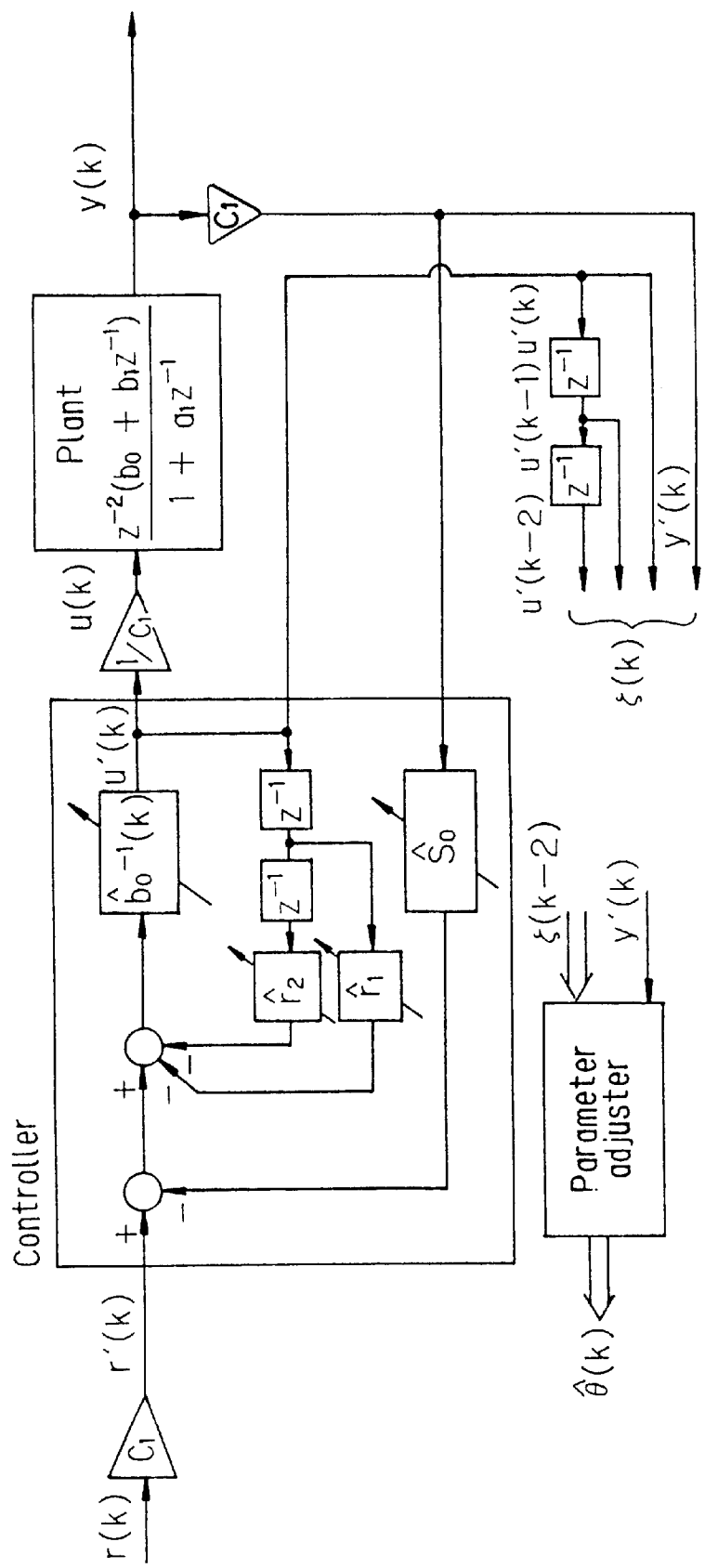
FIG. 19 is a block diagram similar to FIG. 12 but showing an adaptive controller according to the second embodiment of the invention.

FIG. 19 is a block diagram similar to FIG. 12 but showing a second embodiment of the invention. The same model as was used in the first embodiment is again used.

In the second embodiment, the input r(k) to be supplied to the controller is multiplied by the coefficient C1 to obtain r'(k), and the value r'(k) is input to the controller. Then the controller's output u'(k) is divided by the coefficient C1 to obtain the value u(k) which is input to the plant. Further, the plant's output y(k) is multiplied by the coefficient C1 to obtain y'(k), and the value y'(k) is input to the parameter adjuster. Here, the value y'(k) is the product of y(k) and C1 as just mentioned, and the controller's output u'(k) becomes C1 times greater than u(k) in the first embodiment illustrated in FIG. 12. Accordingly, the values zeta (k) and y'(k) become the same values as those shown in FIG. 12. Similarly, since the value u(k) input to the plant has been multiplied by the value 1/C1, the value becomes the same as that illustrated in FIG. 12. Thus, the configuration illustrated in FIG. 19 has the same effect as that illustrated in FIG. 12.

It should be noted that the modification of the first embodiment will not be limited to the second embodiment and many other modifications will be possible. What is important is that only the input to the parameter adjuster should be multiplied by the coefficient, while the value to be input to the plant is kept as it originally is.

A third embodiment of the invention will next be explained.

Figure 20:
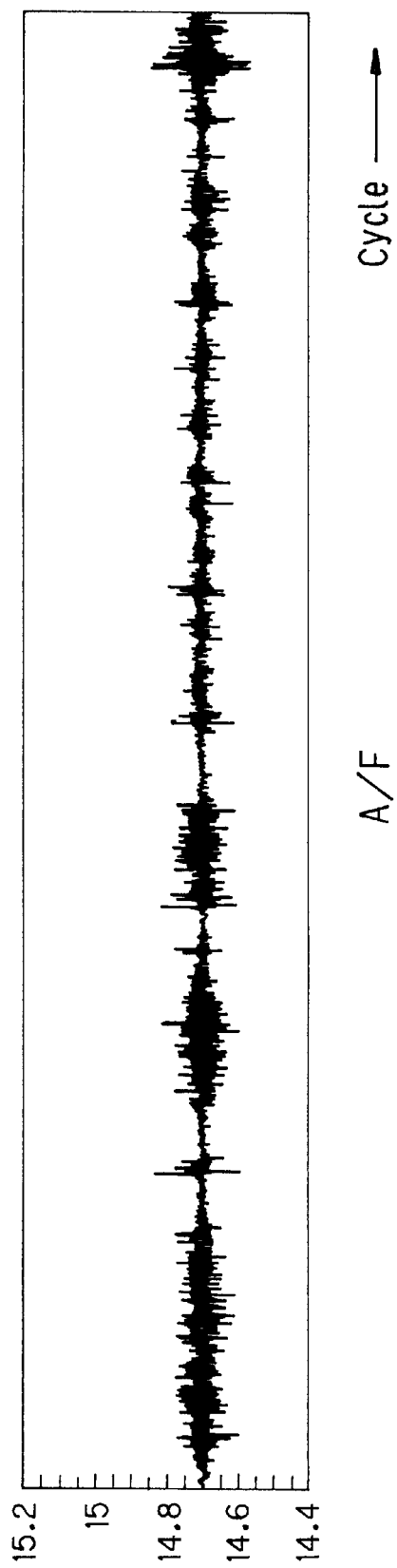
FIG. 20 is the result of a simulation showing the response of the air/fuel ratio when a 16-bit integer calculation is conducted in the adaptive controller illustrated in FIG. 12.

Since it has been found possible in the foregoing to decrease the intermediate values such as $\Gamma(k)$, each variable's LSB is then assigned with a value such that no overflow would occur even if a 16-bit integer calculation is carried out, and simulation is then conducted. FIG. 20 shows the result of this simulation and illustrates the air/fuel ratio at that instance. It is shown here that the control performance of the air/fuel ratio is degraded. This is because, whichever configuration illustrated in FIG. 12 or 19 is adopted to restrict the maximum value of the intermediate value, the least value is also decreased, making it impossible to assign a sufficiently small value to the LSB. In the constant gain algorithm or the constant trace algorithm, this will be not a serious problem since the gain matrix $\Gamma(k)$ is either constant or small in its range of change. In the gradually-decreasing gain algorithm or the variable gain algorithm, since $\Gamma(k)$ is in inverse proportion to the square of zeta (k), it might occasionally become impossible to decrease the maximum/minimum value of $\Gamma(k)$, depending on the change ratio or maximum/minimum value of r(k). As a result, even if the LSB is assigned a small value, overflow might occur if the bit length is restricted to a certain extent. It would be possible to pass the value $\Gamma(k)$ through a limiter so as to restrict it to a certain limit. However, in that case, the value $\hat{\theta}(k)$ would diverge, rather than converge.

The third embodiment aims to solve this problem, and for that purpose it is arranged such that the range of $\Gamma(k)$ is further restricted.

Figure 21:
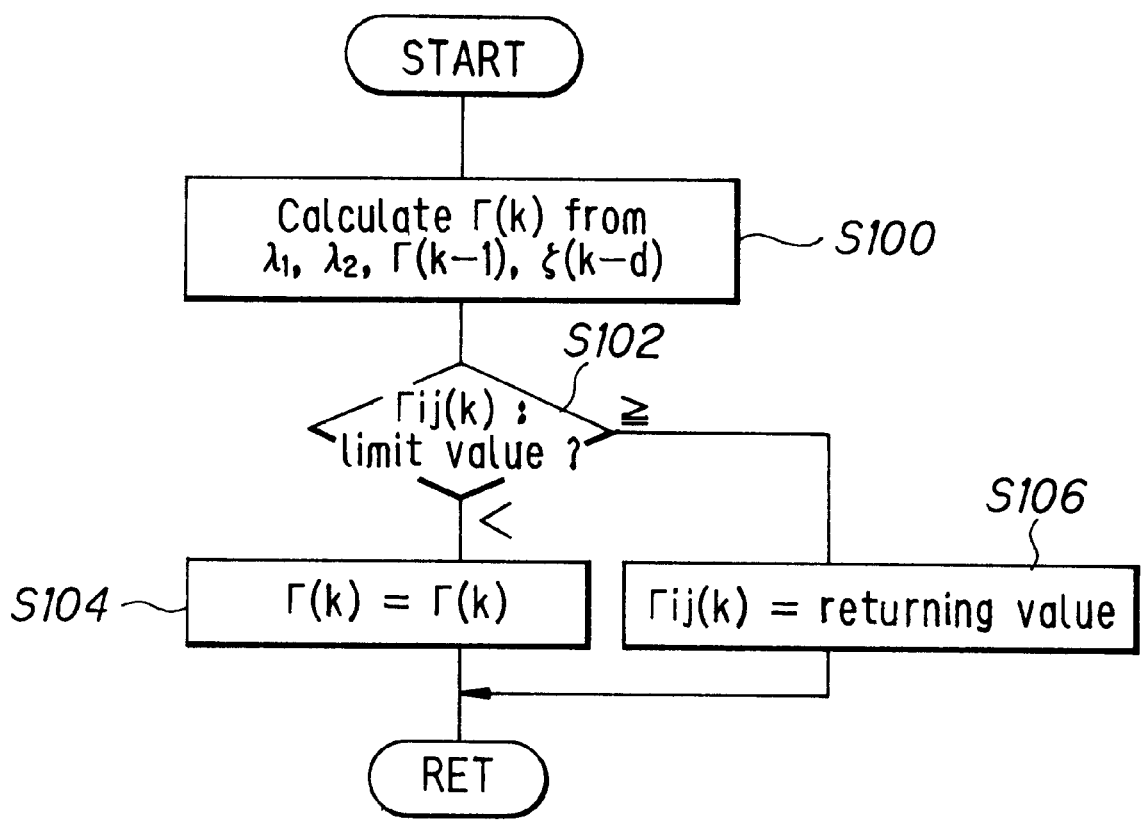
FIG. 21 is a flow chart showing the operation of an adaptive controller according to the third embodiment of the invention.

Explaining this with reference to the flow chart of FIG. 21, the program begins at S100 in which the value $\Gamma(k)$ is calculated according to Equation 3. The program then proceeds to S102 in which the value $\Gamma_{ij}(k)$ is compared with a limit value. If it is less than the limit value, the program passes to S104 in which the calculated value is left as it is. If it is found that the value is not less than the limit value, the program advances to S106, in which the value $\Gamma_{ij}(k)$ is replaced with a value (its initial value) to be returned.

Figure 22:
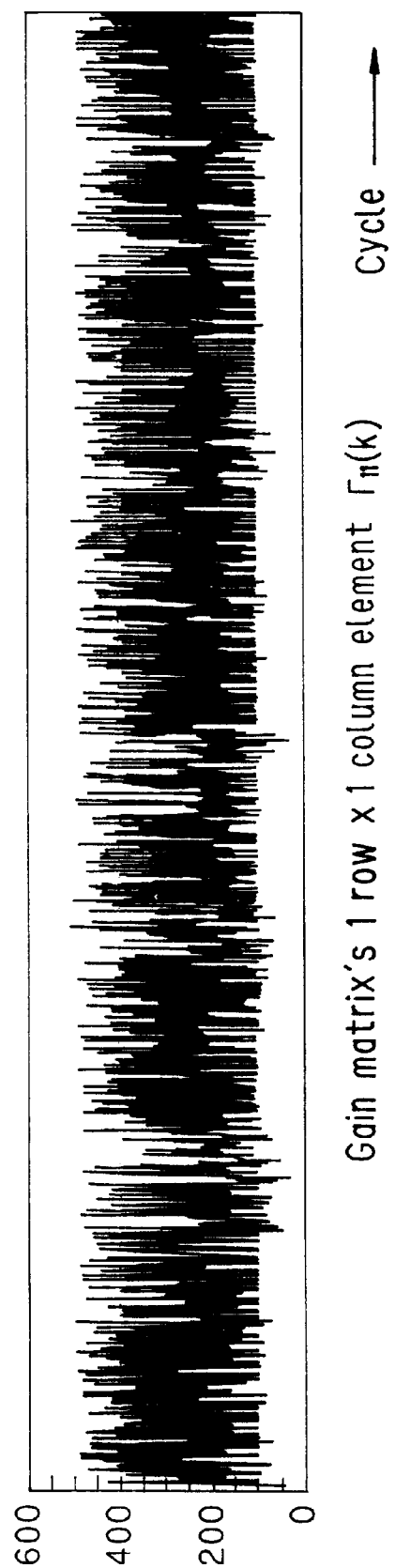
FIG. 22 is the result of a simulation showing the gain matrix element $\Gamma_{11}$ in the third embodiment.
Figure 23:
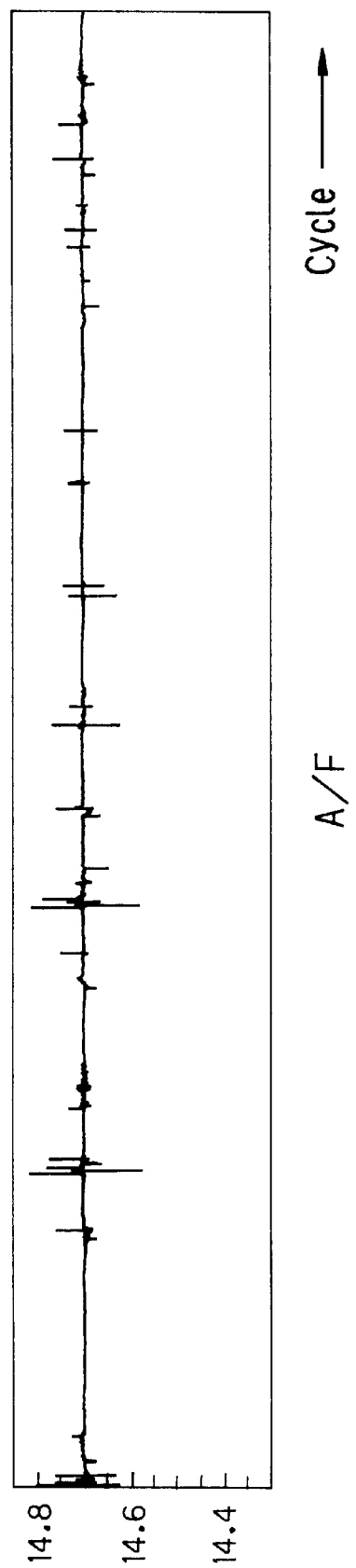
FIG. 23 is the result of a simulation showing the response of the air/fuel ratio in the third embodiment.

FIG. 22 shows the response of the value $\Gamma_{11}(k)$ when the limit value is set to be 500 for the value $\Gamma_{11}(k)$ disclosed in FIG. 17. As disclosed, the value is returned to the returning value (the initial value; here set to be 100) when it exceeds the limit value. Thus, the value $\Gamma_{11}(k)$ does not exceed the limit value. Therefore, the maximum value of $\Gamma_{11}(k)$ is decreased to be 1/9 of the maximum value ($4.5 \times 10^3$) in FIG. 17, and the LSB of $\Gamma_{11}(k)$ can further be reduced. The air/fuel ratio at that instance does not deteriorate as illustrated in FIG. 23 when compared with that illustrated in FIG. 16. It can be easily understood that returning to the initial value prevents diversion, from the fact that the constant gain algorithm does not diverge; Nor does divergence occur in the gradually-decreasing gain algorithm or the variable gain algorithm if $\Gamma(k)$ is started from the initial value at the beginning.

Since the third embodiment is arranged thus, if the LSB is assigned with a small value so as to maintain control accuracy, the bit length is need not be increased, and hence the range of change of the intermediate variables is more strictly restricted such that no overflow occurs. It thus becomes possible to conduct the adaptive control using a short sampling period on a less expensive and lesser-bit-length microcomputer using the gradually-decreasing gain algorithm or the variable gain algorithm. Although only the value $\Gamma(k)$ is selected as a representative of the intermediate variables, the same will, needless to say, also be applied to the other variables.

Figure 24:
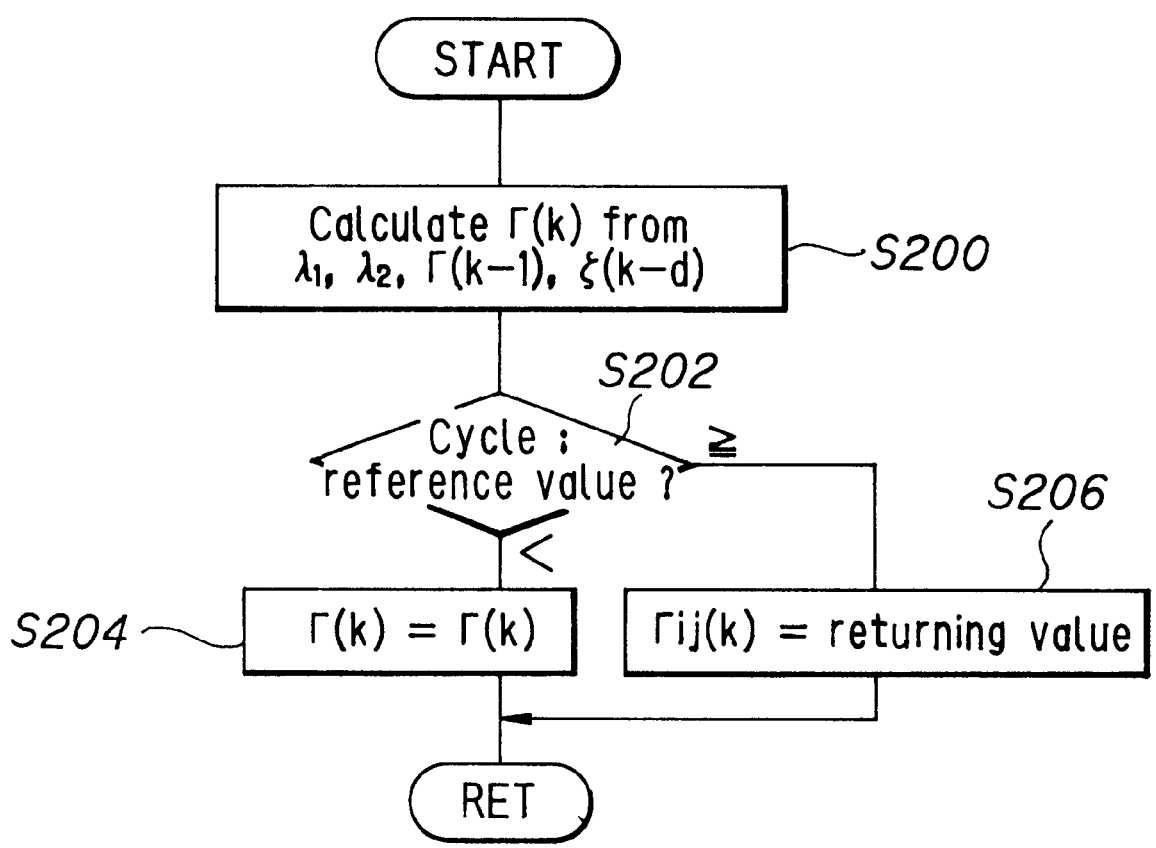
FIG. 24 is a flow chart similar to FIG. 21 but showing the operation of an adaptive controller according to a fourth embodiment of the invention.
Figure 25:
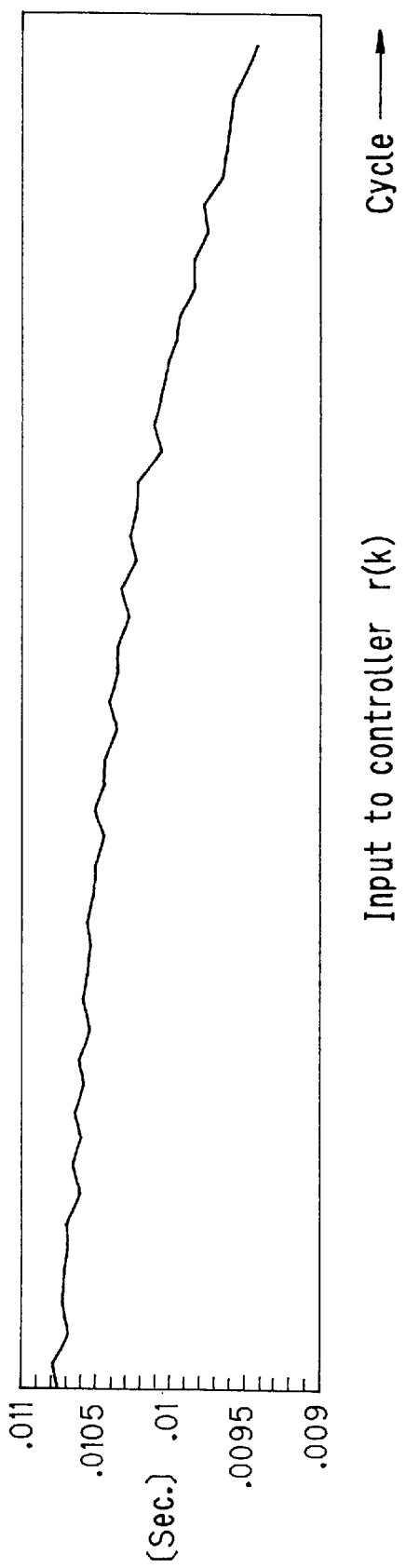
FIG. 25 is the result of a simulation showing an input to the controller of the fourth embodiment.
Figure 26:
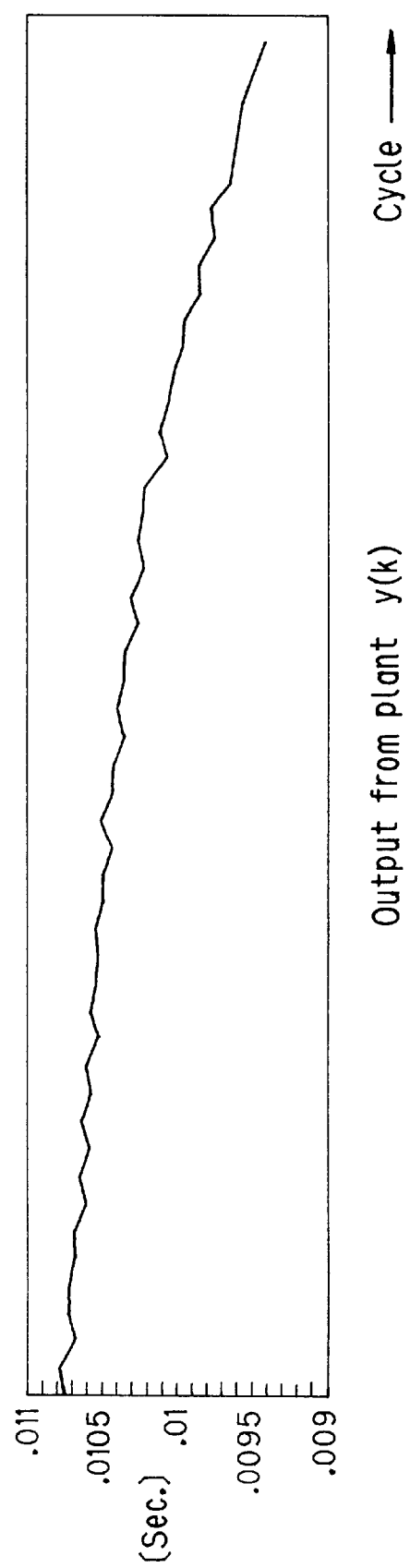
FIG. 26 is the result of a simulation showing an output from the plant in the controller of the fourth embodiment.
Figure 27:
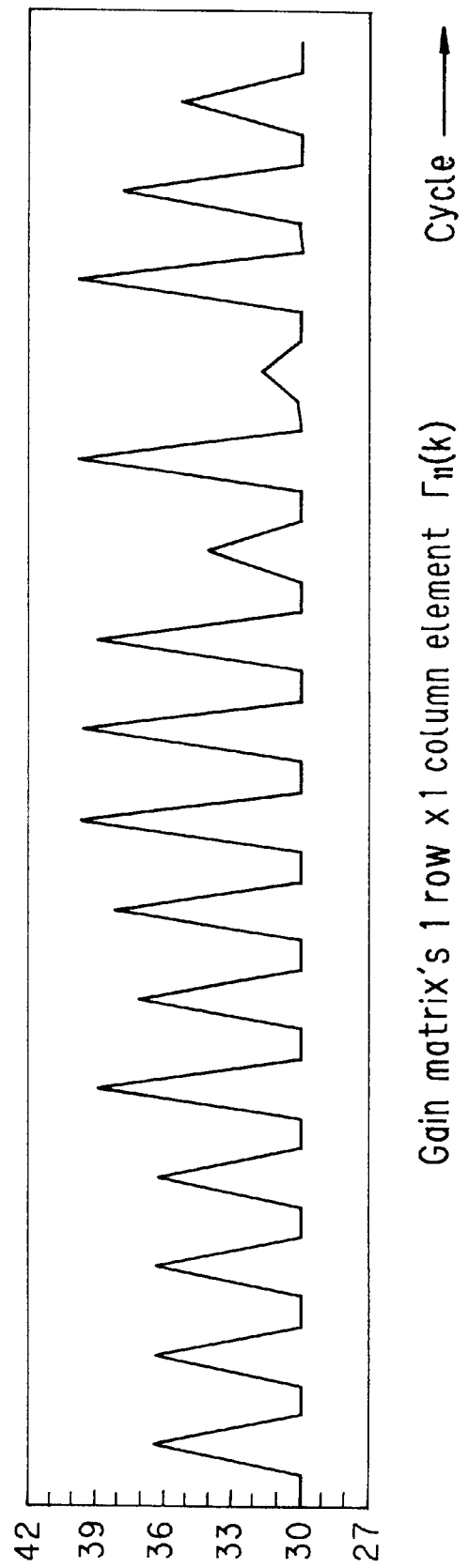
FIG. 27 is the result of a simulation showing the change of the gain matrix element $\Gamma_{11}(k)$ in the controller according to the fourth embodiment.
Figure 28:
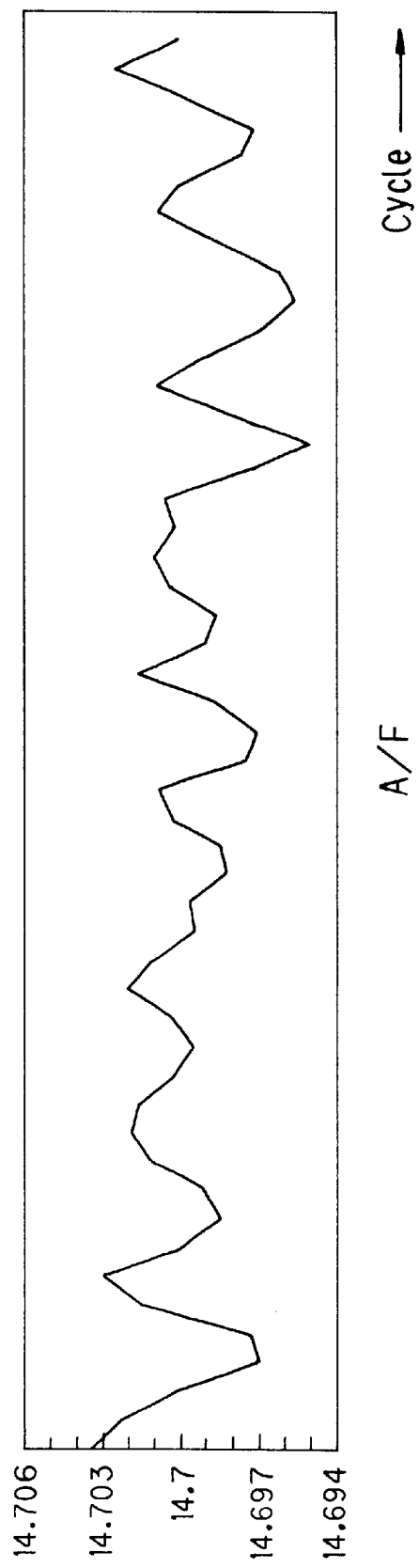
FIG. 28 is the result of a simulation showing the response of the air/fuel ratio in the fourth embodiment.

FIG. 24 is a flow chart similar to FIG. 21 but showing a fourth embodiment of the invention. In the embodiment, the value $\Gamma_{11}(k)$ is automatically returned to the returning value (the initial value) at every predetermined control cycle (e.g., the reference value =3), irrespective of whether or not it actually exceeds the limit value as shown in steps S200 through S206. FIGS. 25 through 28 show the results of a simulation conducted on the configuration of the fourth embodiment. Since the results indicate that the change of the air/fuel ratio is within a range of 14.7±0.006, and, that $\Gamma_{11}(k)$ is restricted to a certain limit while maintaining a sufficient control performance, the embodiment has the same effect as the third one. It should be noted that the reference value may be any value that is not less than 2. It should further be noted that the reference value is able to be varied depending on the operating condition of the plant, the exception being variance at every cycle (since that would become equivalent to the constant gain algorithm).

Figure 29:
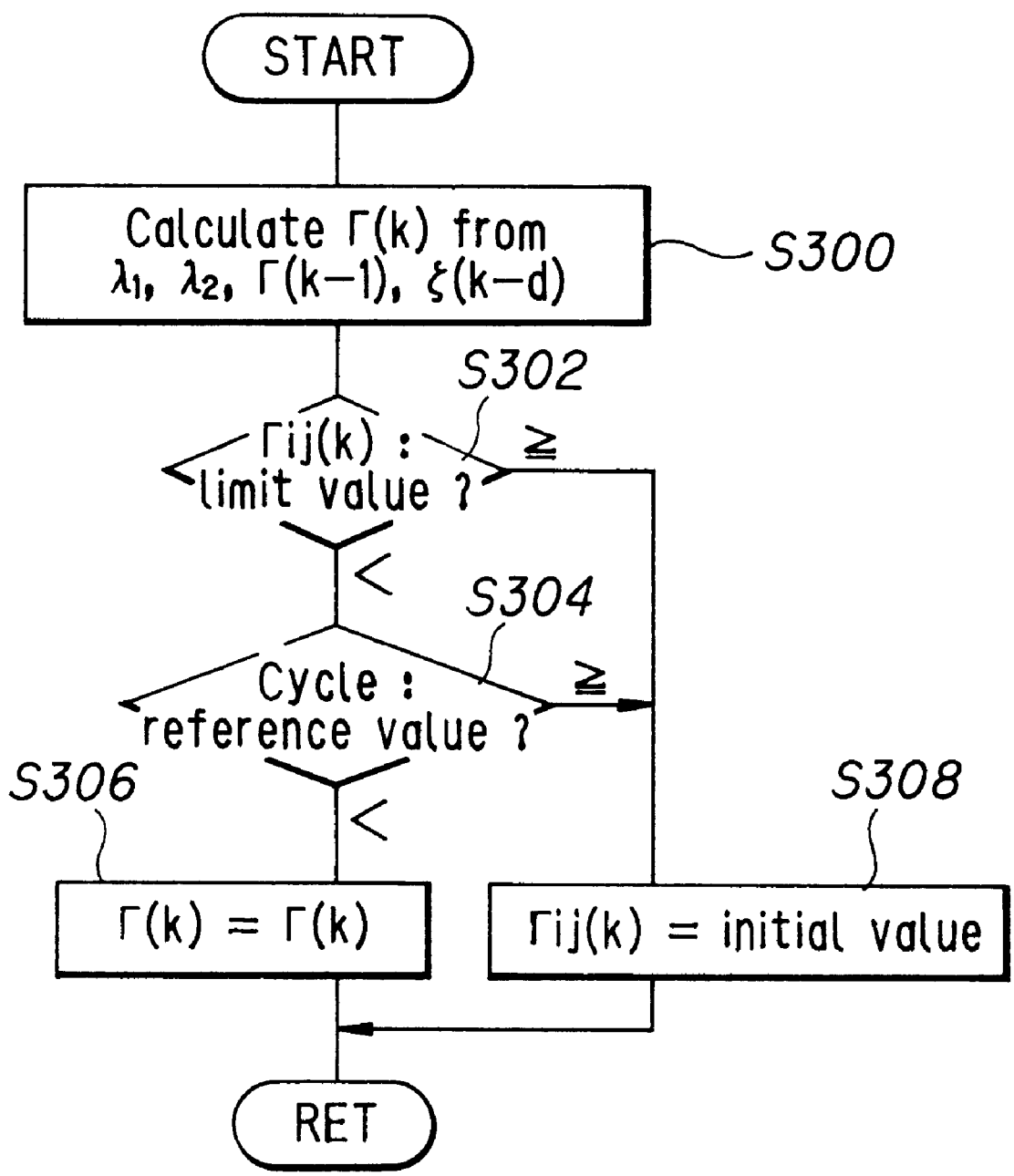
FIG. 29 is a flow chart similar to FIG. 21 but showing the operation of an adaptive controller according to a fifth embodiment.
Figure 30:
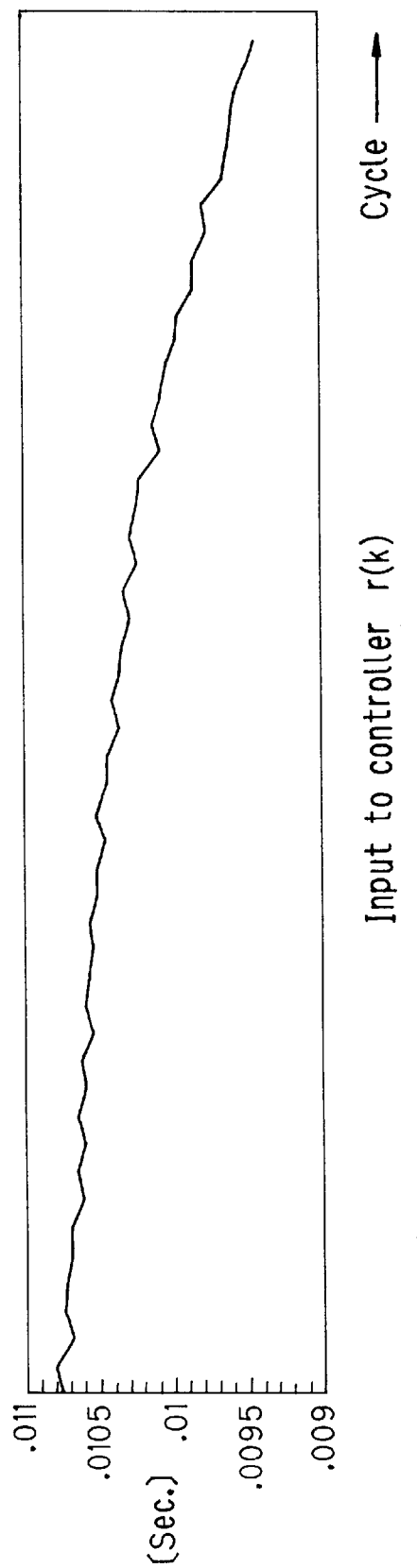
FIG. 30 is the result of a simulation showing an input to the controller of the fifth embodiment.
Figure 31:
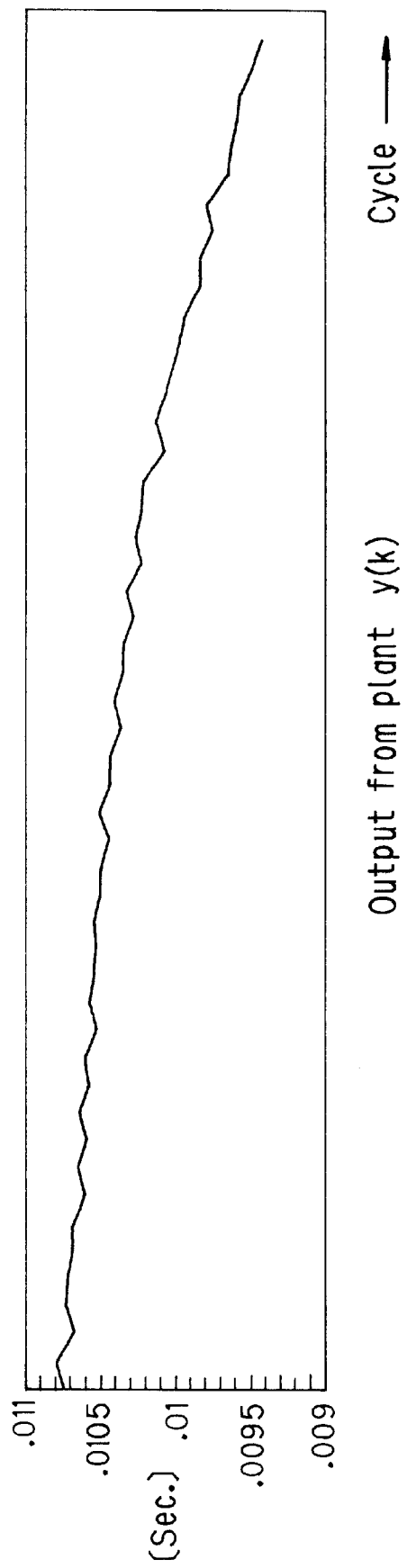
FIG. 31 is the result of a simulation showing an output from the plant in the controller of the fifth embodiment;.
Figure 32:
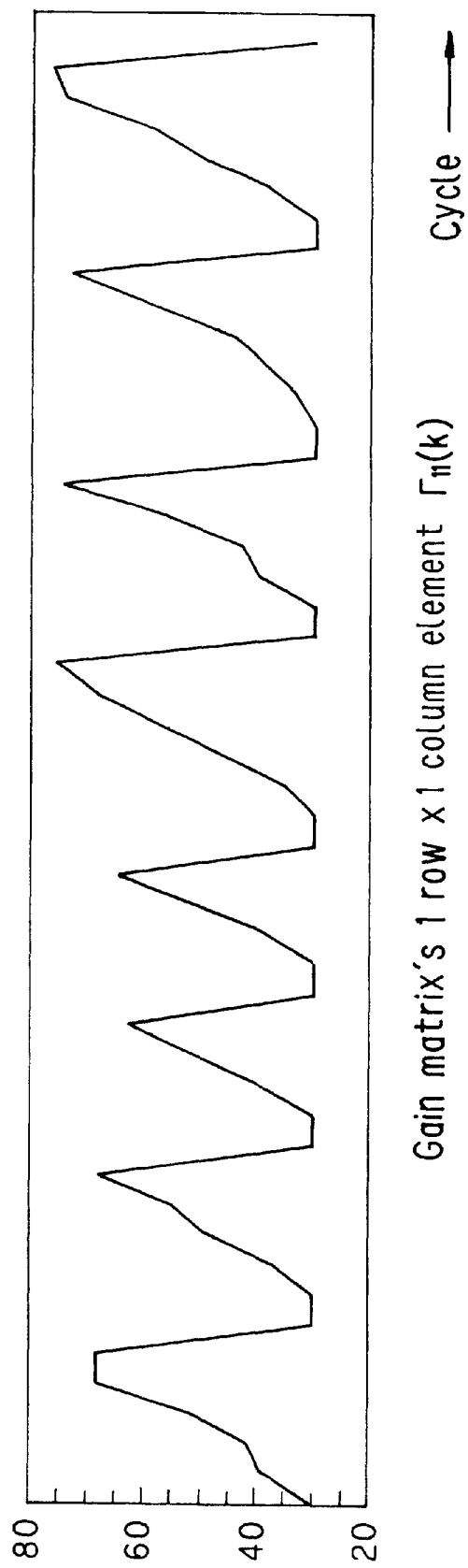
FIG. 32 is the result of a simulation showing the change of the gain matrix element $\Gamma_{11}(k)$ in the fifth embodiment.
Figure 33:
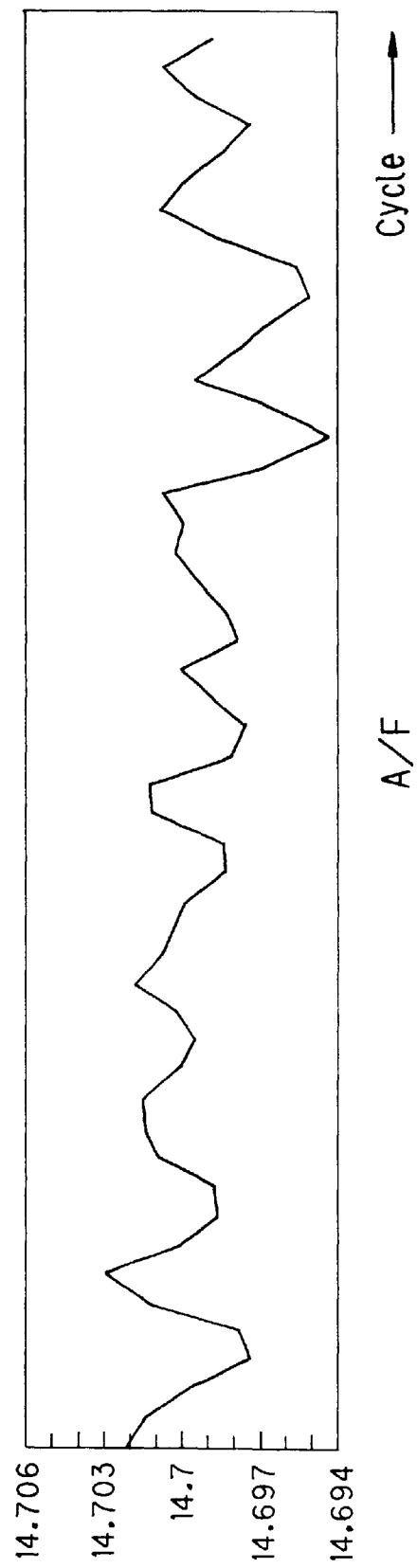
FIG. 33 is the result of a simulation showing the response of the air/fuel ratio in the controller of the fifth embodiment.

FIG. 29 is a flow chart similar to FIG. 21 but showing a fifth embodiment of the invention. In the fifth embodiment, the value $\Gamma_{11}(k)$ is returned to the returning value (the initial value) when the value $\Gamma_{11}(k)$ becomes equal to or greater than the limit value (80 in this embodiment), or when the control cycle reaches the reference value (7 in this embodiment) as disclosed in steps S300 through S308. FIGS. 30 through 33 show the results of simulation on the configuration of the fifth embodiment. The effect of the fifth embodiment is the same as in the third embodiment.

In the foregoing first through fifth embodiments, although the invention has been described with reference to STR, the same may also be applied to MRACS.

In the foregoing first through fifth embodiments, the first (or the second) embodiment and the third (or the fourth or fifth) embodiment can be used independently. Alternatively, after the range of change of intermediate values has been restricted by using the first (or the second) embodiment, it is alternatively possible to further restrict the range by using the third (or the fourth or fifth) embodiment.

In the third and fifth embodiments, although the value $\Gamma_{ij}(k)$ is returned to the returning value (the initial value) when it becomes equal to or greater than the limit value, it is alternatively possible to return a value $\Gamma_{pq}(k)$ (where i≠p or j≠q) to the returning value (the initial value) when the value $\Gamma_{ij}(k)$ is equal to or greater than the limit value. It is further possible to return not only one element, but also two or more elements of the value $\Gamma(k)$ when the value $\Gamma_{ij}(k)$ becomes equal to or greater than the limit value. Further, it is alternatively possible to set limit values for the separate elements of the value.

In the third through fifth embodiments, although the value is returned to the initial value, it is alternatively possible to return it to an appropriate value other than the initial value.

The invention has thus been shown and described with reference to the specific embodiments. However, it should be noted that the invention is in no way limited to the details of the described arrangements; changes and modifications may be made without departing from the scope of the appended claims.

What is claimed is:

1. An adaptive controller, including:
   a controller which receives an input r(k) and generates an output u(k) which is inputted to a controlled object which generates an output y(k); and
   a parameter adjuster which receives the output u(k) from the controller and the output y(k) from the controlled object and which adjusts a parameter θ(k) of the controller using a parameter adjustment law expressed in a recurrence formula using intermediate values to be calculated by the parameter adjuster, which ensures non-linear system stability;
   wherein all inputs to be supplied to the parameter adjuster, including the output u(k) from the controller and the output y(k) from the controlled object are multiplied by a coefficient C1 being other than 1, before being inputted to the parameter adjuster, such that a range of change of the intermediate values calculated by the parameter adjuster is restricted.

2. An adaptive controller as recited in claim 1, wherein the input r(k) to the controller and the output y(k) from the controlled object are multiplied by the coefficient C1, before being inputted to the controller and the parameter adjuster, while the input u(k) to the controlled object is divided by the coefficient C1, after being outputted from the controller, but before being inputted to the parameter adjuster, such that all inputs to be supplied to the parameter adjuster, including the output u(k) from the controller and the output y(k) from the controlled object are multiplied by the coefficient C1, before being inputted to the parameter adjuster, such that a range of change of the intermediate values calculated by the parameter adjuster is restricted.

3. An adaptive controller according to claim 2, wherein the input r(k) to the controller and the output y(k) from the controlled object are multiplied by the same coefficient.

* * * * *